US008047178B2

(12) United States Patent
Brickley

(10) Patent No.: US 8,047,178 B2
(45) **Date of Patent: *Nov. 1, 2011**

(54) FORCE TRANSFER MECHANISM FOR AN ENGINE

(76) Inventor: Michael Dennis Brickley, Austin, TX (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/356,679

(22) Filed: Jan. 21, 2009

(65) Prior Publication Data

US 2009/0120404 A1 May 14, 2009

Related U.S. Application Data

(60) Continuation of application No. 11/627,617, filed on Jan. 26, 2007, now Pat. No. 7,481,188, which is a division of application No. 11/303,479, filed on Dec. 16, 2005, now Pat. No. 7,219,647.

(51) Int. Cl.
*F02B 75/18* (2006.01)
*F16C 7/00* (2006.01)

(52) U.S. Cl. .................. 123/197.3; 123/53.1; 123/53.3; 123/53.5; 123/53.6

(58) Field of Classification Search ................. 123/52.1, 123/52.2, 52.4, 52.7, 53.6, 54.7, 55.5, 55.7, 123/197.3, 197.4, 51 R, 51 A, 51 BC, 51 BB, 123/51 AA, 51 AC
See application file for complete search history.

(56) References Cited

U.S. PATENT DOCUMENTS 2,388,756 A * 11/1945 Meyers ..................... 123/51 BC
2,731,002 A * 1/1956 Fiala-Fernbrugg ......... 123/51 R

* cited by examiner

*Primary Examiner* — Noah Kamen
(74) *Attorney, Agent, or Firm* — Eric W. Cernyar

(57) ABSTRACT

A force transfer mechanism is provided for an internal-combustion engine. In the most preferred configuration, the force transfer mechanism comprises two inter-connected first class levers that are driven by four pistons. Each of the pistons is driven through its non-powered strokes by the action of the piston in its powered stroke on the first class levers. The force transfer mechanism also drives the crankshaft through a single connecting rod. The force transfer mechanism provides for less frictional loss, and greater efficiency, than a typical internal combustion engine.

20 Claims, 16 Drawing Sheets

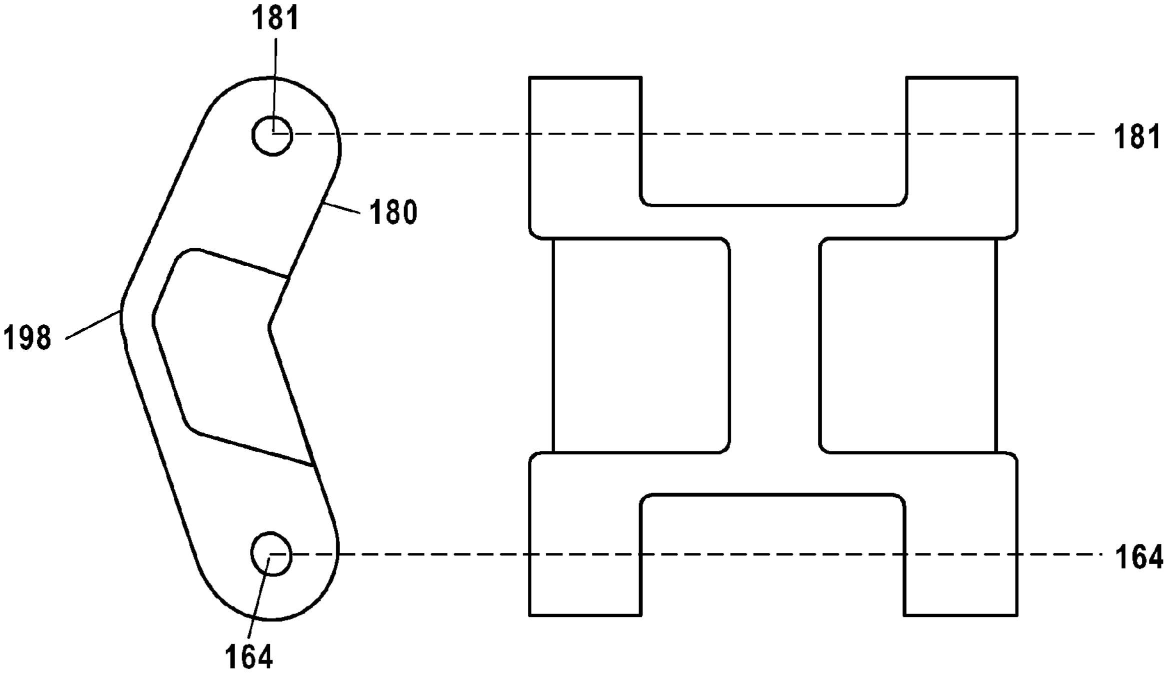
Fig. 6A
Fig. 6B
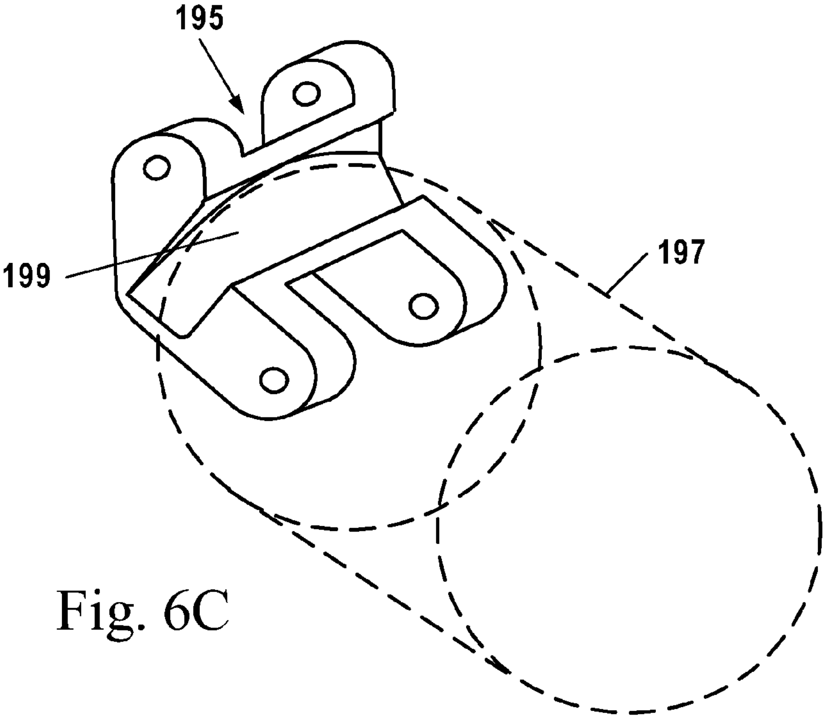
Fig. 6C

FORCE TRANSFER MECHANISM FOR AN ENGINE

RELATED APPLICATIONS

This application is a continuation of and claims the benefit of my copending U.S. patent application Ser. No. 11/627,617, filed Jan. 26, 2007 entitled FORCE TRANSFER MECHANISM FOR AN ENGINE, which issued as U.S. Pat. No. 7,481,188, which is in turn a divisional of U.S. patent application Ser. No. 11/303,479, also entitled FORCE TRANSFER MECHANISM FOR AN ENGINE, filed Dec. 16, 2005, and issued as U.S. Pat. No. 7,219,467, both of which are herein incorporated by reference.

FIELD OF THE INVENTION

This invention relates to engines, and more particularly, but not limited to four-stroke internal combustion engines.

BACKGROUND OF THE INVENTION

To appreciate the advantages of the present invention, it is important to understand various aspects of how a typical internal combustion (IC) engine works.

In a typical IC engine, where the cylinders are fixed with respect to the engine frame, the motion of the connecting rods create side forces on their corresponding pistons that push against the cylinder walls. A standard four-cylinder internal combustion engine comprises four pistons, a crankshaft, and four connecting rods, each having a "big end" and a "small end." Each piston is connected to the crankshaft through a corresponding connecting rod. The "big end" of the connecting rod is connected to one of several "rod journals" on the crankshaft—also known as a "crank throw"—that is offset from the "main journals" of the crankshaft. The "small end" of the connecting rod is pivotally attached to the piston via a "wrist pin." As the piston reciprocates, the angle of the connecting rod with respect to the cylinder's longitudinal dimension changes. While the angular orientation of the connecting rod with respect to the piston is other than zero degrees, the connecting rod creates a side force on the piston against the cylinder wall. The magnitude of the force varies in relation to the angular orientation, gas pressures, and inertia forces.

To distribute these sideways forces, stabilize the path of the piston, and address friction issues, pistons are typically made with piston skirts that travel with the pistons inside the cylinders. While the pistons and skirts are likely lubricated to perform their role effectively, the larger the piston skirt, the greater a cross-sectional area of oil is sheared by the piston as it reciprocates. While a piston skirt performs an important function, its use creates an energy loss and thus decreases mechanical efficiency.

Furthermore, in a typical IC engine, while there is energy delivered by each piston to an output load through the crankshaft, a significant amount of energy is transferred through the crankshaft from each piston performing a power stroke to the pistons that are going through any of the three-non-powered strokes. Each piston cycles through a sequence of four strokes—the intake stroke, the compression stroke, the power stroke, and the exhaust stroke. At any given time while the engine is running, there is one cylinder performing a power stroke, another cylinder performing an exhaust stroke, another performing an intake stroke, and another a compression stroke. Because work must be performed to move each of the three pistons on non-powered strokes, the energy necessary to move them must be delivered by the piston performing the power stroke (excluding energy stored through inertia). In a standard in-line four-cylinder engine, this energy is delivered through the crankshaft.

The use of the crankshaft in a typical IC engine to transfer these between-cylinder forces and connect the cylinders to a common load increases the strength, size and rigidity requirements of the crankshaft as well as the size and number of bearing journals. Because the crankshaft is performing the dual roles of (1) transferring energy between the cylinders and (2) connecting the cylinders to a common load, the standard engine configuration results in a loss of energy and decreases mechanical efficiency.

Furthermore, a typical four-cylinder IC engine has five main journals and four rod journals to accommodate the four connecting rods driven by the pistons. The cross-sectional oil shear area across each of these nine-or-more relatively large bearings traveling through 360 degrees of rotation, multiplied by the distance the bearings travel per crankshaft revolution, is significant, and results in a loss of energy and decreases mechanical efficiency.

SUMMARY OF THE INVENTION

Various embodiments of the present invention improve upon the standard in-line 4 cylinder engine in a variety of ways. It is believed that the most preferred embodiment results in the greatest number of improvements.

In the preferred embodiment, a multiple watt-linkage force transfer mechanism is provided. (In 1784, James Watt reportedly invented what is now commonly referred to as a "watt linkage," which is a mechanism for converting circular motion into near-straight-line motion, and incorporated it into a steam engine.) The force transfer mechanism comprises two "bell cranks" that are used to drive a single crank through a watt linkage mechanism. Each bell crank, in turn, is driven (and drives; depending on the stroke) two pistons through a watt linkage mechanism. The watt linkages connected to the pistons enable the connection end of the piston to travel along substantially straight paths, significantly reducing side loads against the piston walls. This potentially eliminates the need for piston skirts, or at least reduces their necessary lengths. It also potentially eliminates the need for a wrist pin between the pistons and their connection to the remainder of the mechanism.

Also, all four pistons preferably drive a single connecting rod. This simplifies the crankshaft design and the corresponding strength and rigidity requirements for the crankshaft by reducing the necessary number of rod journals and main journals on the crankshaft. It also provides a more efficient means of transferring the between cylinder forces. In one embodiment, the crankshaft can simply comprise a single rod journal and two main journals.

Moreover, the between-cylinder forces (between the power-stroke piston and the three pistons in a non-power-stroke) are transferred through the force transfer mechanism rather than through the crankshaft journals. The connecting rod transmits only the force remaining after the other three pistons consume the force that they need. In other words, all of the force transferred by the connecting rod to the crankshaft is used to drive the crankshaft and mechanisms connected to it.

Because the various components of the force transfer mechanism rotate about straight-pin type pivots that are either fixed in place, or that move along relatively straight paths (as opposed to the circular path of a rod journal caused by a revolution of the crankshaft), it is believed that the diameter of the pivot pins of the force transfer mechanism can be made fairly small, relative to the standard diameter of a rod journal, in order to safely and reliably deliver a desired amount of power.

Furthermore, the pistons are most preferably arranged in what is referred to herein as a "collinear H-cross configuration"—defined in the detailed description—in order to balance the inertial masses within the mechanism, except part of the mass of the connecting rod. In this configuration, the motion of each piston and its links are balanced by an equal and opposite motion of an opposing collinear piston and its links on the opposite side of the force transfer mechanism. Furthermore, the inertial mass of each piston is balanced on the opposite side of the bell crank fulcrum by an equivalent piston.

In summary, the most preferred embodiment potentially offers the following advantages over a standard in-line four-cylinder IC engine:

(1) The nearly complete elimination of side loads on the pistons potentially eliminates the need for piston skirts—limiting the piston friction losses to those resulting from the seals.

(2) The total cross-sectional area of the oil being sheared, times the shear distance, per crankshaft revolution will potentially be a small fraction of the area times distance being sheared in the typical engine.

(3) Because all of the between-cylinder forces generated are transferred through pins which rotate only a small amount, rather than through journals that have to rotate 360 degrees, each piston's work is not diminished by a chain of piston skirts, crankpin journals, and main bearings. In this manner, the mechanism also reduces part of the "pumping losses" a typical IC engine suffers when running at less-than-full throttle, where the pressure of the atmosphere outside the cylinder works against the engine.

(4) The force transfer mechanism internally balances the inertial masses associated with the four pistons.

It is believed that one of the inventive aspects driving the most preferred embodiments of the invention (but not necessarily all of the embodiments of the invention) is a focus on reducing the product of the total cross sectional area of oil being sheared times the distance it travels, instead of simply thinking about decreasing friction through reductions in bearing size, materials, and reduced friction surfaces.

While the most preferred embodiment is believed to benefit from all of the aforementioned advantages, the invention is broad enough to encompass embodiments that do not appropriate all, some, or any of these cited advantages. The invention disclosed herein encompasses numerous different kinds of embodiments—including embodiments that have only a single watt linkage mechanism; embodiments that utilize no watt linkage mechanisms; embodiments that utilize several sets of force transfer mechanisms; force transfer mechanisms that utilize what is later described as a "non-collinear H-cross configuration"; and force transfer mechanisms in which the pistons are not arranged in parallel with each other. The scope of any given claim will be set forth by the claim language itself—although this specification will explicitly define certain claim terms.

These and many other embodiments and advantages of the invention will be readily apparent to those skilled in the art from the following detailed description taken in conjunction with the annexed sheets of drawings, which illustrate the invention.

BRIEF DESCRIPTION OF THE DRAWINGS

FIG. 6A is an enlarged view of the outer arm of FIG. 1.

FIG. 6B is an orthogonal view of the outer arm of FIG. 6.

FIG. 6C is a perspective view of the outer arm of FIG. 6.

DETAILED DESCRIPTION

Figure 1:
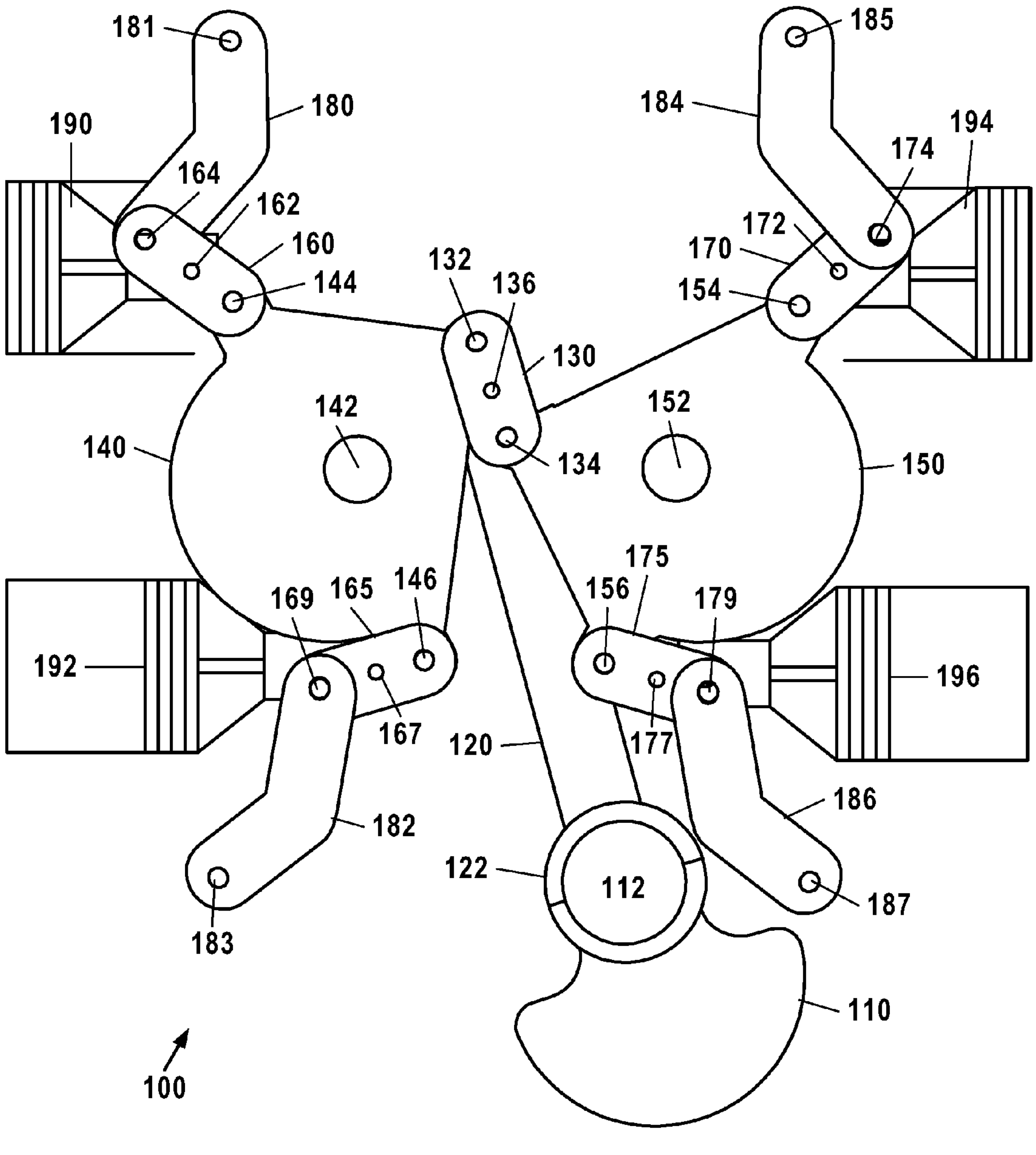
FIG. 1 is a side view of one embodiment of a force transfer mechanism according to the present invention.

Before the subject invention is described further, it is to be understood that the invention is not limited to the particular embodiments of the invention described below or depicted in the drawings. Many modifications may be made to adapt or modify a depicted embodiment without departing from the objective, spirit and scope of the present invention Therefore, it should be understood that, unless otherwise specified, this invention is not to be limited to the specific details shown and described herein, and all such modifications are intended to be within the scope of the claims made herein.

Figure 2:
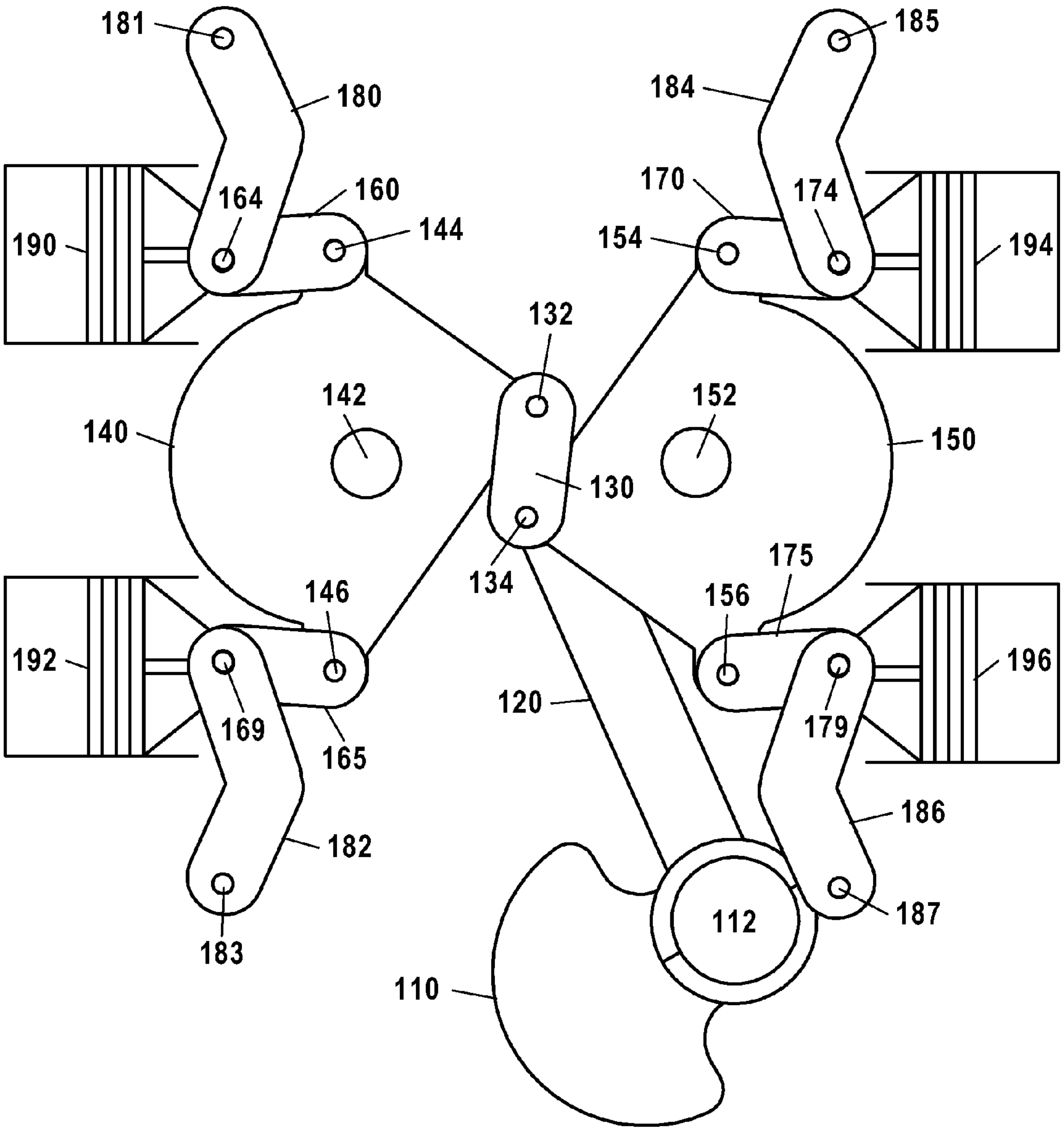
FIG. 2 is a second view of the force transfer mechanism of FIG. 1 with all of the pistons halfway through their respective strokes.
Figure 3:
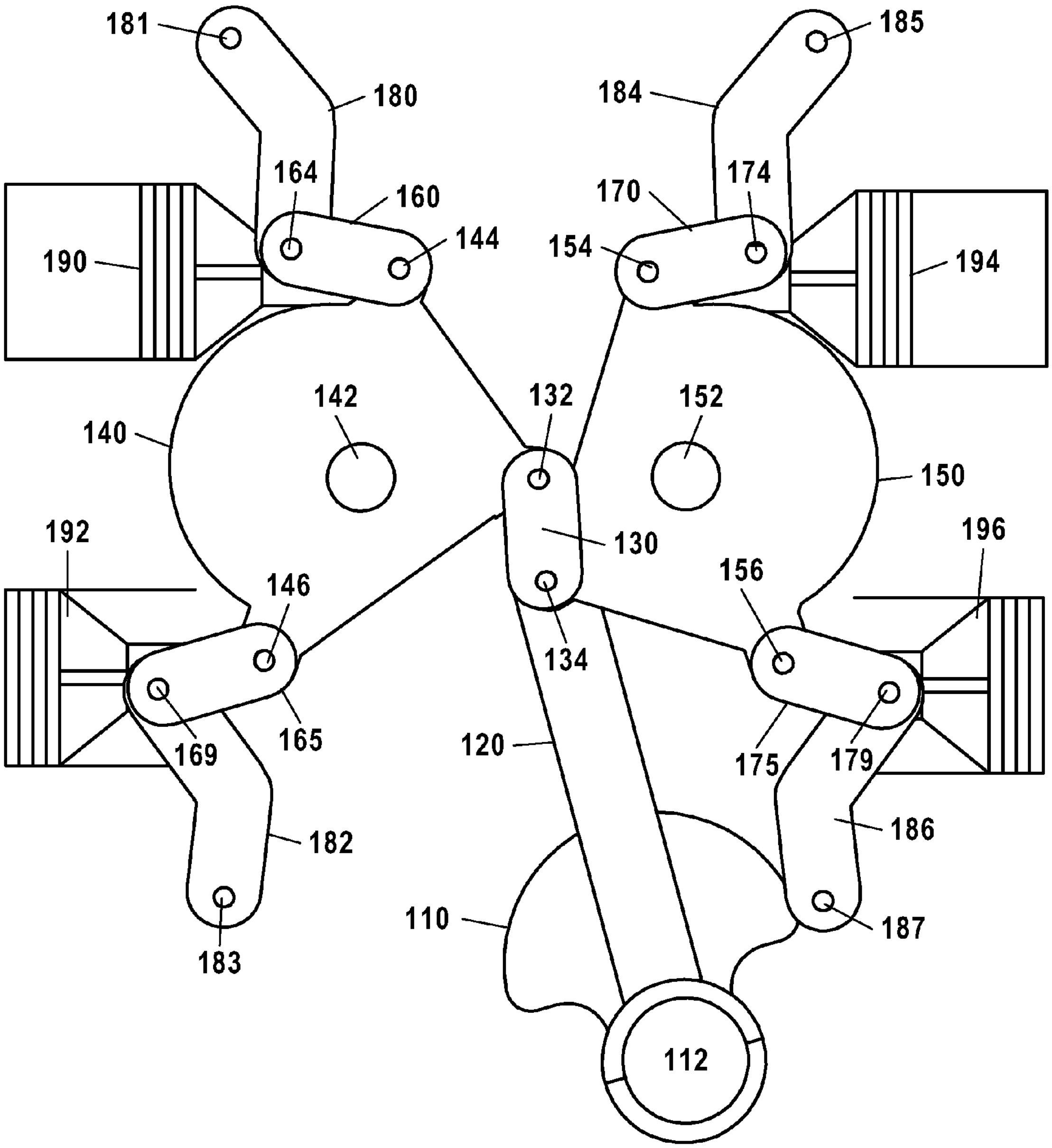
FIG. 3 is a third view of the force transfer mechanism of FIG. 1 with the crankshaft turned 180 degrees from the position depicted in FIG. 1.

FIGS. 1-3 are views of one embodiment of a force transfer mechanism 100 according to the present invention. Force transfer mechanism 100 comprises a three-arm bell crank 140 driven by pistons 190 and 192 and another three-arm bell crank 150 driven by pistons 194 and 196. FIG. 1 shows pistons 190 and 194 at top dead center and pistons 192 and 196 at bottom dead center. FIG. 2 shows each of the pistons 190, 192, 194 and 196 at the midpoint of their travel. FIG. 3 depicts pistons 190 and 194 at bottom dead center and pistons 192 and 196 at top dead center.

The three-arm bell crank 140 pivots about a fulcrum 142 that is fixed in the frame. Likewise, bell crank 150 pivots about a fulcrum 152 that is also fixed in the frame. Bell crank 140 includes three bell crank pins 132, 144, and 146. Likewise, bell crank 150 includes three bell crank pins 134, 154, and 156. A connecting link 130 joins bell crank 140 to bell crank 150. A first end of the connecting link 130 pivots about the bell crank pin 132 and the second end of the connecting link 130 pivots about bell crank pin 134. Unlike the fulcrums 142 and 152, the bell crank pins 132 and 134 are not fixed with respect to the engine block.

The distance between the fulcrum 142 and the bell crank pin 132 is the same as the distance between the fulcrum 152 and the bell crank pin 134. Therefore, the connecting link 130 and bell cranks 140 and 150 together comprise what is known as a "watt linkage." The bell cranks 140 and 150 comprise the "side links" of this watt mechanism, and the connecting link 130 comprises the "coupler link" of this watt mechanism (see explanation of "side links" and "coupler links" in the description below).

A pivot joint 136 is mounted at the midpoint of the connecting link 130—that is, it is mounted at the point that is halfway between bell crank pins 132 and 134. What is commonly referred to as the "small end" 137 (FIG. 5) of the connecting rod 120—that is, the end of the connecting rod that is opposite the crankshaft end 122 of the connecting rod 120—is pivotally attached to the pivot joint 136 of the connecting link 130. What is commonly referred to as the "big end" of the connecting rod 120—that is, the crankshaft end 122 of the connecting rod 120—pivots about a rod journal 112 of the engine crankshaft 110. Because the pivot joint 136 is at the midpoint of the connecting link 130, which is the "coupler link" of a watt mechanism, the pivot joint 136 drives the connecting rod 120 along a substantially straight path.

FIG. 1 depicts not just one watt linkage but in fact five watt linkages. Watt linkages are used to transfer the force from each piston 190, 192, 194, and 196 to the bell cranks 140 and 150. Each piston 190, 192, 194, and 196 is connected to a corresponding connecting link 160, 165, 170, or 175 via a piston pin 162, 167, 172, or 177 mounted at the midpoint of the connecting link 160, 165, 170, or 175. These connecting links 160, 165, 170, and 175 each comprise a "coupler link" of a watt linkage mechanism.

Piston 190 drives connecting link 160, which is pivotally mounted both to the bell crank 140 via bell crank pin 144, and to the outer arm 180 via inner joint 164. Outer arm 180—which forms one of the "side links" of a watt linkage mechanism—is pivotally mounted in fixed relation to the engine block via an outermost bearing 181. The bell crank 140 forms the other "side link" of this watt linkage mechanism. Because of this watt linkage mechanism, the connection end of piston 190 is able to travel in a substantially straight line as it drives the connecting link 160.

Piston 192 drives connecting link 165, which is pivotally mounted both to bell crank 140 via bell crank pin 146, and to the outer arm 182 via inner joint 169. Outer arm 182—which forms one of the "side links" of another watt linkage mechanism—is also pivotally mounted in fixed relation to the engine block via outermost bearing 183. The bell crank 140 forms the other "side link" of this watt linkage mechanism. Because of this watt linkage mechanism, the connection end of piston 192 is able to travel in a substantially straight line as it drives the connecting link 165.

Piston 194 drives connecting link 172, which is pivotally mounted both to bell crank 150 via bell crank pin 154, and to the outer arm 184 via inner joint 174. Outer arm 184—which forms one of the "side links" of yet another watt linkage mechanism—is also pivotally mounted in fixed relation to the engine block via outermost bearing 185. The bell crank 150 forms the other "side link" of this watt linkage mechanism. Because of this watt linkage mechanism, the connection end of piston 194 is able to travel in a substantially straight line as it drives the connecting link 172.

Piston 196 drives connecting link 175, which is pivotally mounted both to bell crank 150 via bell crank pin 156, and to outer arm 186 via inner joint 179. Outer arm 186—which forms one of the "side links" of yet one more watt linkage mechanism—is also pivotally mounted in fixed relation to the engine block via outermost bearing 187. The bell crank 150 forms the other "side link" of this watt linkage mechanism. Because of this watt linkage mechanism, the connection end of piston 196 is able to travel in a substantially straight line as it drives the connecting link 175.

Because pistons 190, 192, 194, and 196 are able to travel in substantially straight line paths, this practically eliminates the side loads exerted by the pistons on their respective cylinders, and minimizes if not eliminates the need for a piston skirt.

It is worth noting that the distance between the outermost bearing 181 and the inner joint 164 is equal to the distance between fulcrum 142 and bell crank pin 144. Likewise, the distance between outermost bearing 183 and inner joint 169 is equal to the distance between fulcrum 142 and bell crank pin 146. Similarly, the distance between outermost bearing 185 and inner joint 174 is equal to the distance between fulcrum 152 and bell crank pin 154. Finally, the distance between outermost bearing 187 and inner joint 179 is equal to the distance between fulcrum 152 and bell crank pin 156.

In FIG. 1, bell crank pin 144 is radially disposed, with respect to fulcrum 142, approximately 180 degrees from the bell crank pin 146. Likewise bell crank pin 154 is radially disposed, with respect to fulcrum 152, approximately 180 degrees from bell crank pin 156. With this arrangement, piston 190 may be oriented in parallel with piston 192, and piston 194 may be oriented in parallel with piston 196.

The angle between the line intersecting bell crank pin 144 and fulcrum 142 and the line connecting fulcrum 142 with bell crank pin 132 is acute, that is, less then 90 degrees. The angle between the line connecting bell crank 150 with bell crank pin 154 and the line connecting fulcrum 152 with bell crank pin 134 is obtuse, that is more then 90 degrees. Preferably, values for these acute and obtuse angles are chosen so that the piston 192 can be collinearly oriented with piston 196 and so that piston 190 can be collinearly oriented with piston 194. In such an arrangement, pistons 190 and 194 either move towards each other at the same time or away from each other at the same time. Likewise, pistons 192 and 196 move towards each other or away from each other at the same time.

With this symmetrical arrangement of the pistons, the forces exerted by the pistons 190, 192, 194, and 196 are mostly balanced through the force transfer mechanism itself and not through the crankshaft 110.

Figure 4:
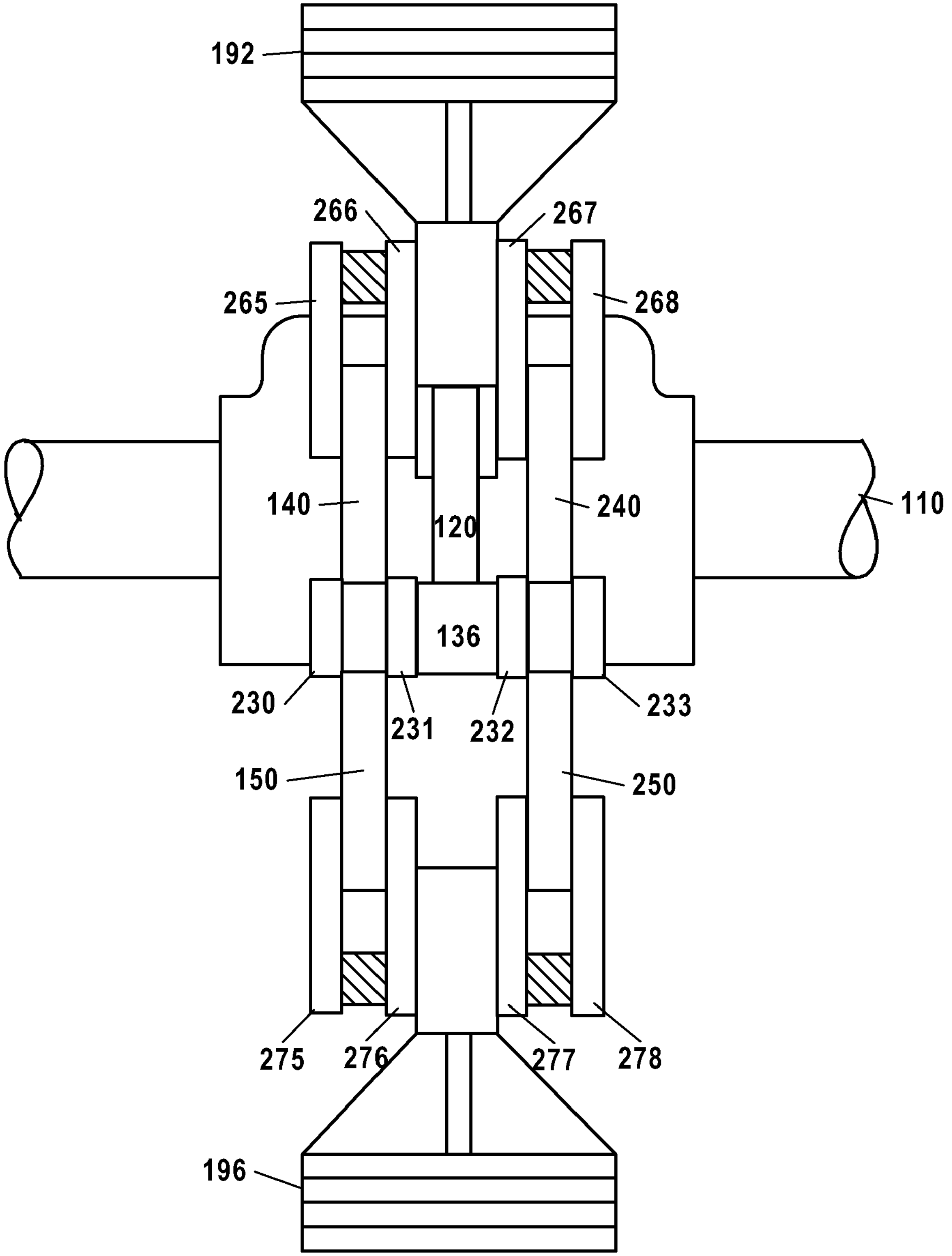
FIG. 4 is an orthogonal view of the mechanism of FIG. 1.

FIG. 4 is an orthogonal view of a more detailed embodiment of the force transfer mechanism 100 in FIG. 1. This embodiment employs opposing pairs of bell cranks and connecting links on either side of the plane in which the four pistons 190, 192, 194, and 196 travel. This eliminates moments perpendicular to the travel of the pistons 190, 192, 194, and 196 that the force of the pistons on the piston pins 162, 167, 172, or 177 would otherwise generate. Accordingly, a bell crank 240 is disposed opposite bell crank 140 and another bell crank 250 is disposed opposite bell crank 150. Connecting link 130, which comprises link plates 230 and 231, is also matched by another connecting link comprising links 232 and 233. (See also FIG. 5). Connecting link 165, which comprises link plates 265 and 266, are also matched with another connecting link comprising link plates 267 and 268. Connecting link 175 comprising link plates 275 and 276 are also matched by an opposing connecting link comprising link plates 277 and 278. Although not illustrated in FIG. 4, a similar multiple-link-plate configuration would be supplied for connecting links 160 and 170.

Figure 5A:
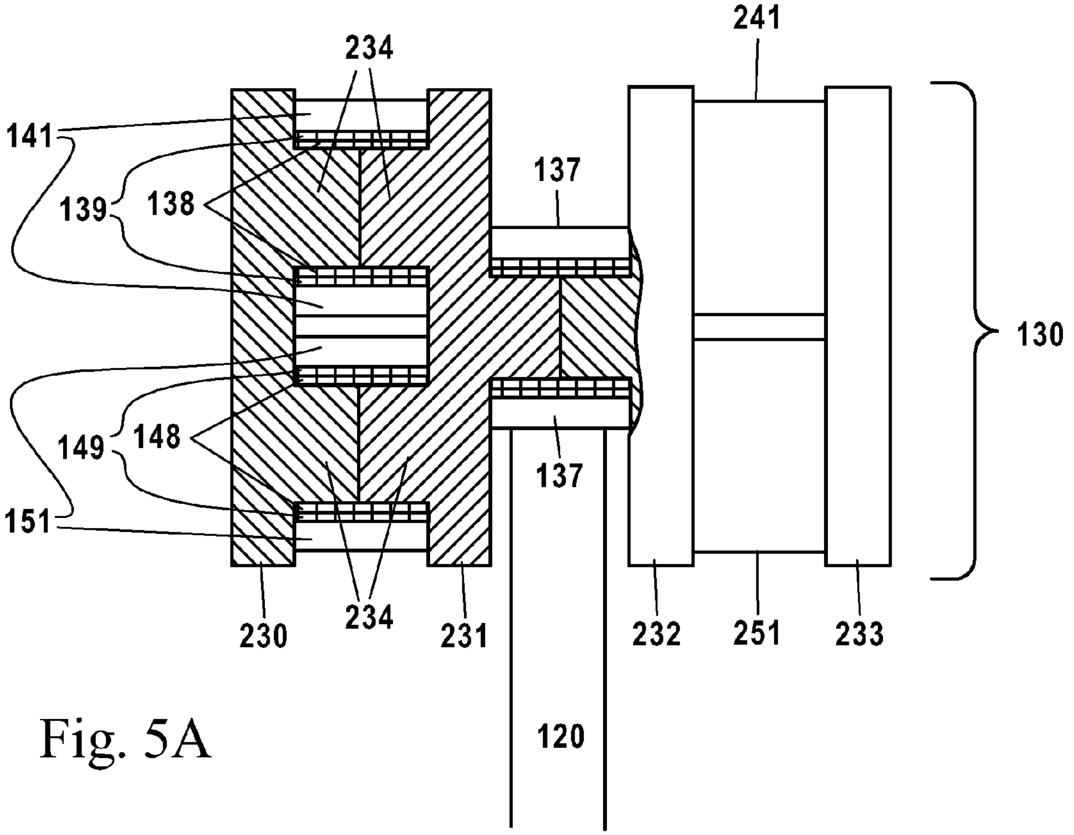
FIGS. 5A and 5B are cross-sectional views of various connecting links in FIG. 1.

FIG. 5A depicts a cross-sectional view of the connecting link 130 and its four link plates 230, 231, 232, and 233. The link plates 230-233 include bosses 234. Steel bushings 138 and 148 hold the bosses 234 together. Bronze bushings 139 and 149, which are lubricated, ride on the steel bushings 138 and 148, enabling the journal sleeves 141, 151, 241, and 251 of the bell cranks 140, 150, 240, and 250 to pivot about the bosses 234.

Figure 5B:
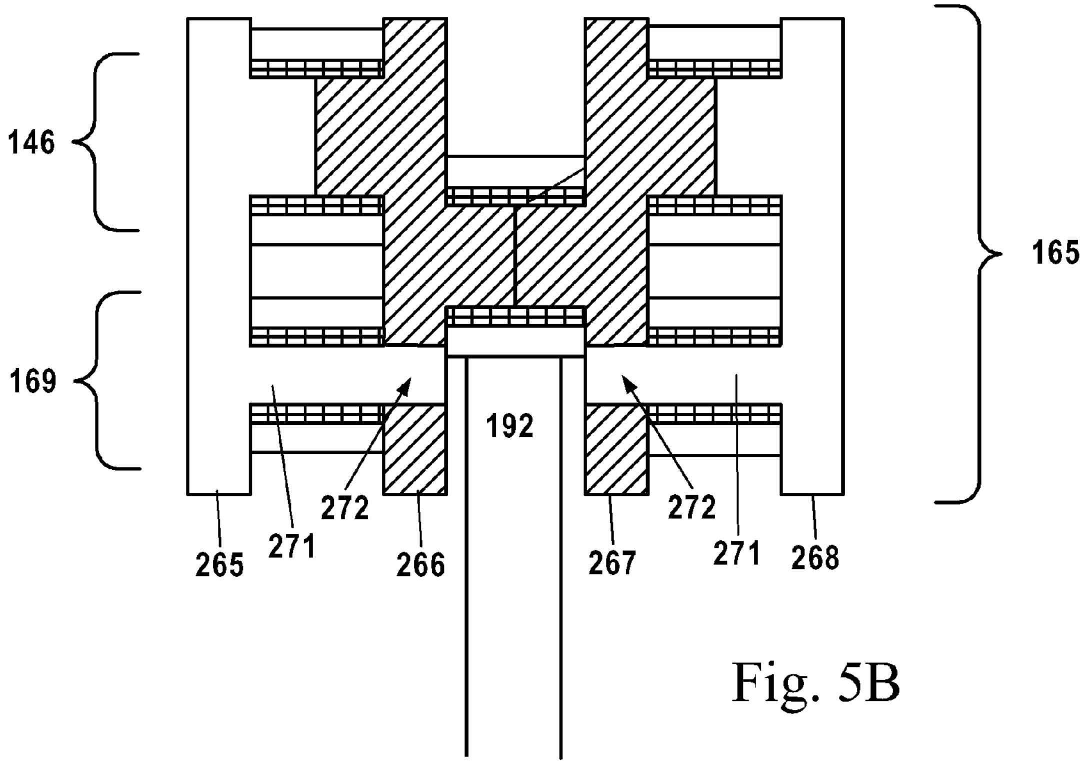

FIG. 5B depicts a cross-sectional view of the connecting link 165 and its four link plates 265-268. Here, for purposes of facilitating engine assembly, it is preferred that in the region of the inner joint 169, the outer link plates 265 and 268 include bosses 271 that extend all the way through openings 272 in inner link plates 266 and 267. The cross-sectional views of the other three connecting links 160, 170, and 175, not shown, are identical.

FIGS. 6A, 6B, and 6C are enlarged, orthogonal, and perspective views of the outer arm 180 of FIG. 1. Because the outer arms 180, 182, 184, and 186 reach inside of the cylinders 197 when the pistons are at their minimum volume, the outer arms have bends 198 in them from the side view and arches 199 across their axes to allow the arms to clear the edge of the cylinder 197. The outer arms are of sufficient width to provide adequate strength and rigidity in stabilizing the paths of the pistons while still being able to fit inside the cylinders. On the outer arm 186 near the crankshaft 110 (see FIG. 2), the connecting rod may pass between the opening 195 in the arm (see FIG. 6C) near the bearings 187.

Figure 7:
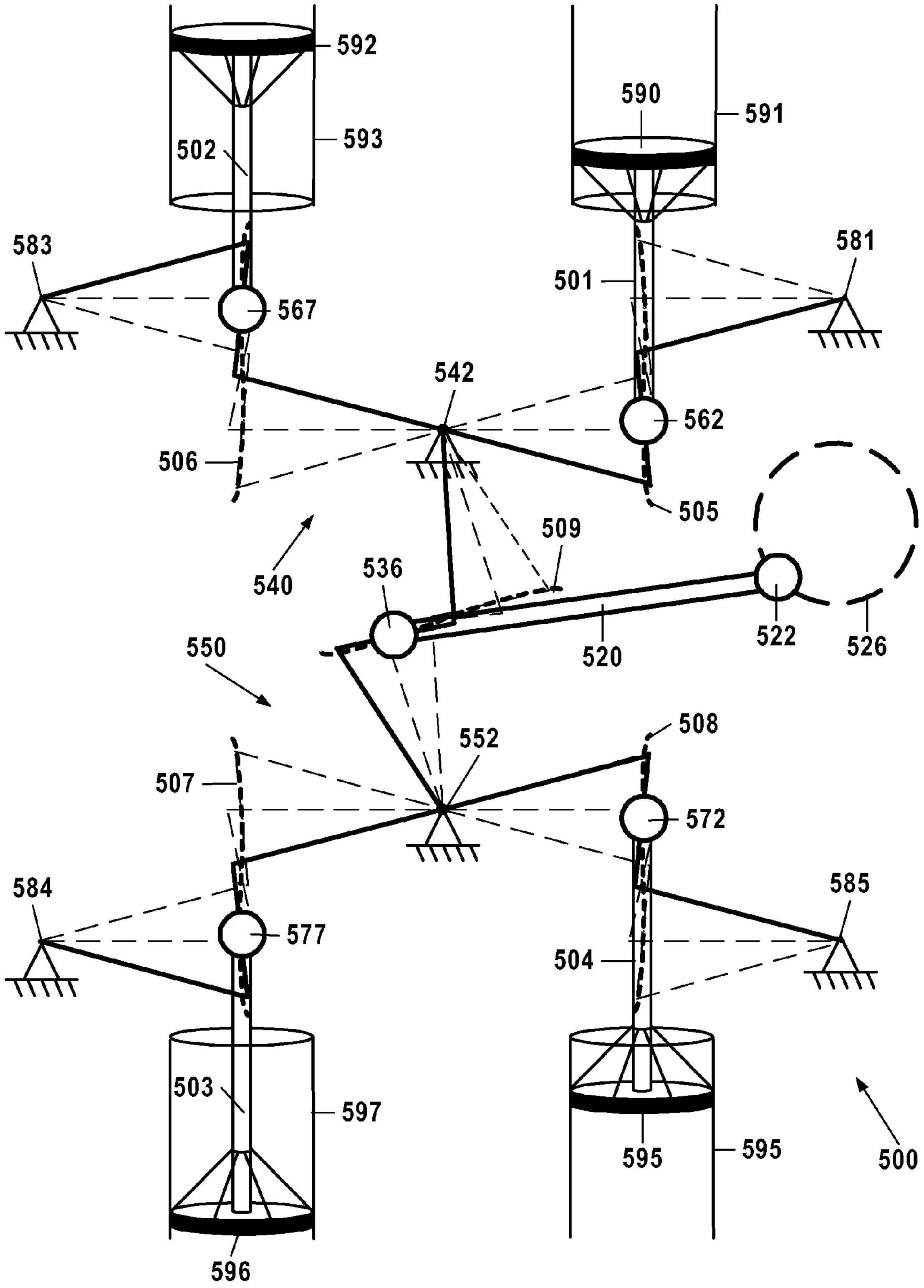
FIGS. 7-9 are schematic representations of one embodiment of a force transfer mechanism at different stages of piston travel.
Figure 8:
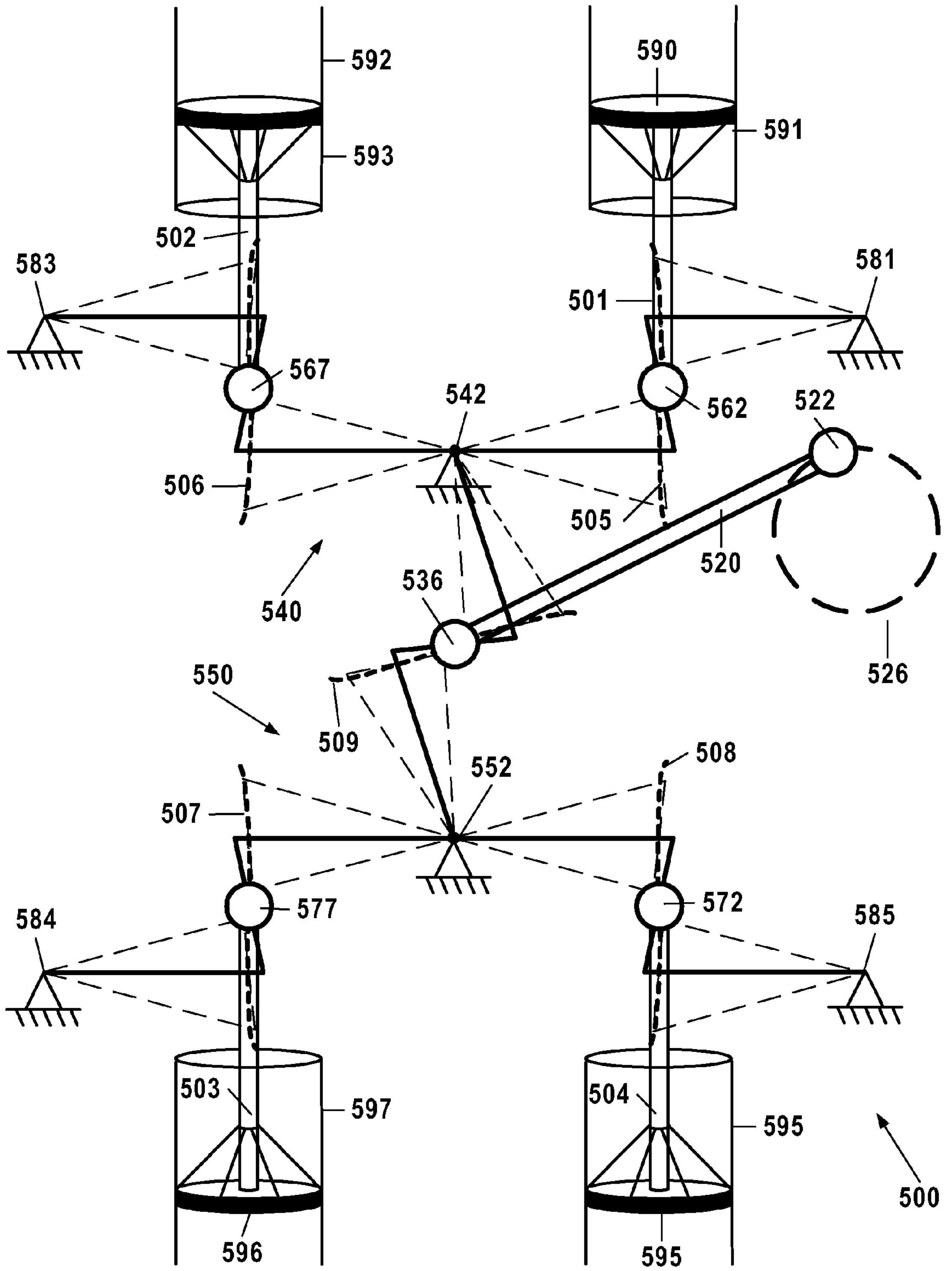
Figure 9:
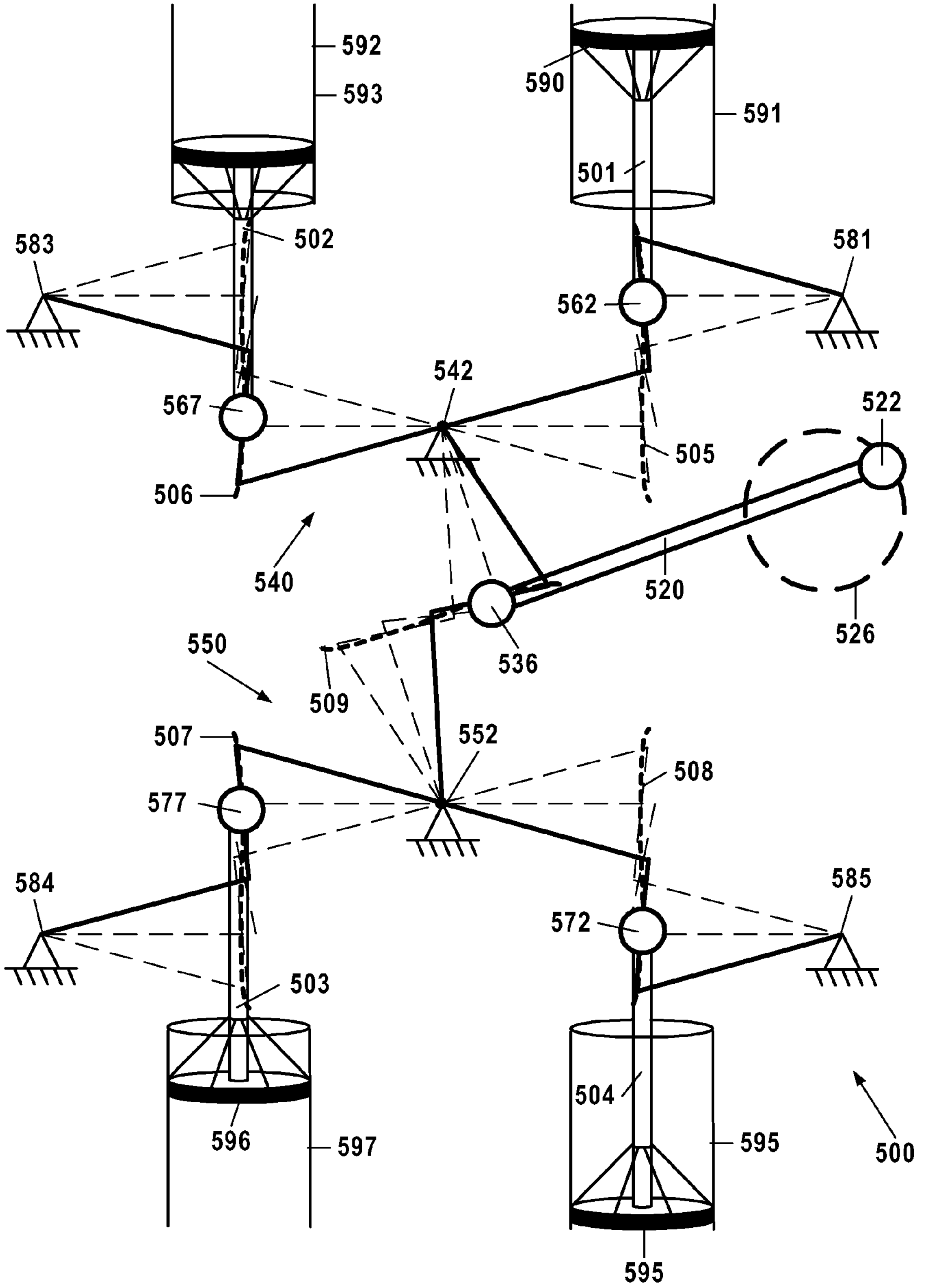

FIGS. 7-9 are schematic representations of another embodiment of a force transfer mechanism at different stages of piston travel. Force transfer mechanism 500 comprises a bell crank 540 that pivots about a frame-anchored fulcrum 542 and another bell crank 550 that pivots about a frame-anchored fulcrum 552. A first watt linkage formed between fulcrums 542 and 552 drives a connecting rod 520 to turn a crankshaft (not shown).

The crankshaft pin 522 of connecting rod 520—which is typically mounted to the rod journal (not shown) of the crank shaft rod—moves along circular travel path 526, thereby turning the crankshaft. The opposite end of the connecting rod 520 pivots about joint 536 of the watt linkage mechanism formed between fulcrums 542 and 552. Joint 536 travels along the substantially straight travel path 509.

Pistons 590 and 592 drive the bell crank 540 through second and third watt mechanisms. Likewise, pistons 595 and 596 drive the bell crank 550 through fourth and fifth watt linkage mechanisms.

Piston rod (or link) 501 of piston 590 is pivotally attached to piston pin 562 of the second watt linkage mechanism formed between the fulcrum 542 and the frame-anchored pivot 581. The piston pin 562 travels along travel path 505, which is substantially straight and parallel to the piston rod 501. The substantially straight travel path of piston rod 501 eliminates or minimizes the necessity of a piston skirt that would slide with piston 590 along the walls of cylinder 591.

Piston rod (or link) 502 of piston 592 is pivotally attached to piston pin 567 of the third watt linkage mechanism formed between the fulcrum 542 and the frame-anchored pivot 583. The piston pin 567 travels along travel path 506, which is substantially straight and parallel to the piston rod 502. The substantially straight travel path of piston rod 502 eliminates or minimizes the necessity of a piston skirt that would slide with piston 592 along the walls of cylinder 593.

Piston rod 503 (or link) of piston 596 is pivotally attached to piston pin 577 of the fourth watt linkage mechanism formed between the fulcrum 552 and the frame-anchored pivot 584. The piston pin 577 travels along travel path 507, which is substantially straight and parallel to the piston rod 503. The substantially straight travel path of piston rod 503 eliminates or minimizes the necessity of a piston skirt that would slide with piston 596 along the walls of cylinder 597.

Piston rod (or link) 504 of piston 595 is pivotally attached to piston pin 572 of the fifth watt linkage mechanism formed between the fulcrum 552 and the frame-anchored pivot 585. The piston pin 572 travels along travel path 508, which is substantially straight and parallel to the piston rod 504. The substantially straight travel path of piston rod 504 eliminates or minimizes the necessity of a piston skirt that would slide with piston 595 along the walls of cylinder 595.

Figure 10:
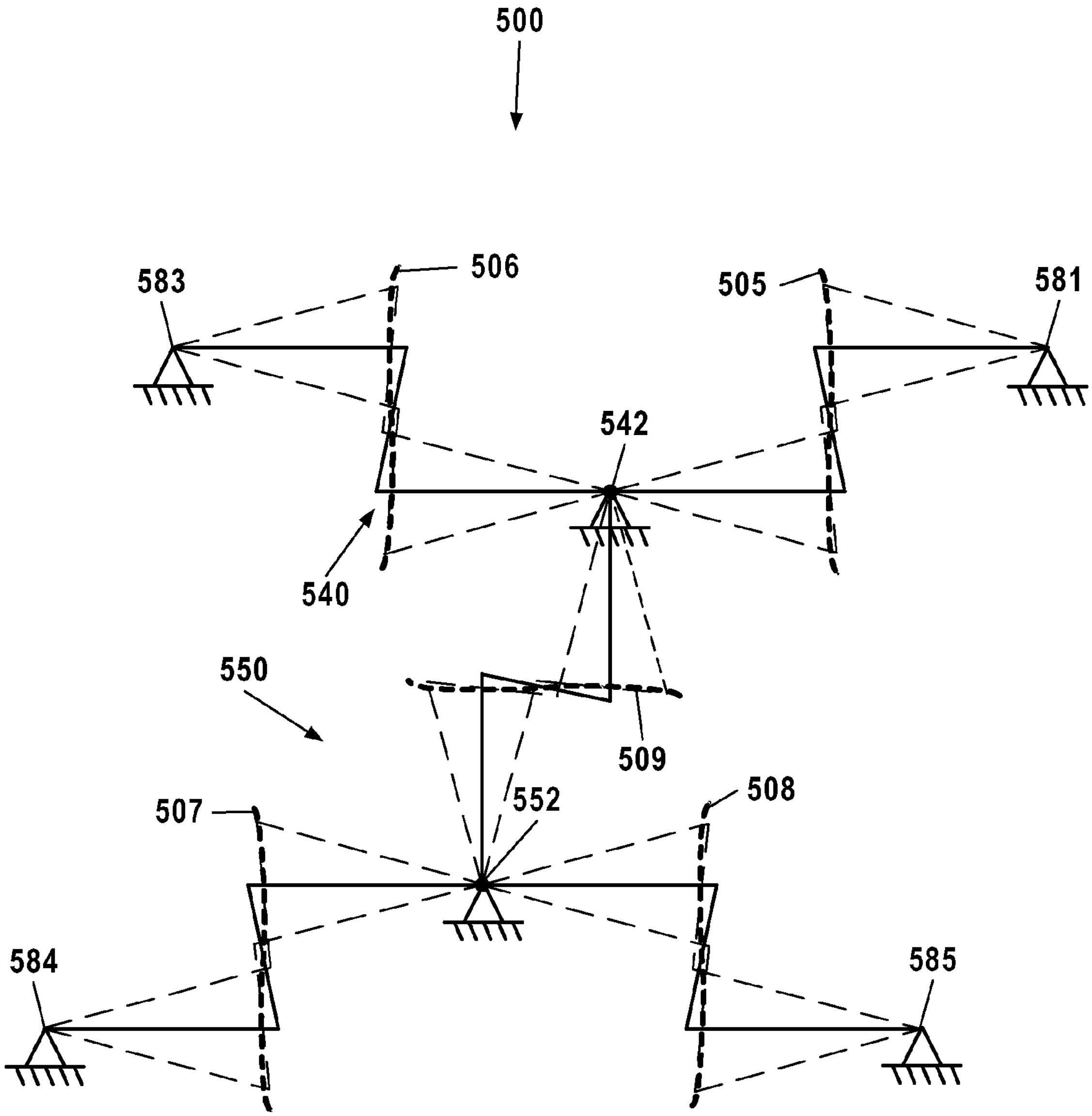
FIG. 10 is a schematic representation of an alternative embodiment of the force transfer mechanism of the present invention.

FIG. 10 is a schematic representation of an alternative embodiment of the force transfer mechanism of the present invention. In FIG. 10, as in FIGS. 7-9 the travel paths 505-508 are coplanar and substantially parallel with each other. But unlike the embodiment shown in FIGS. 7-9, travel path 506 is not substantially collinear with travel path 507 and travel path 505 is not substantially collinear with travel path 508. Rather, in FIG. 10, the relative spacing and arrangement of fulcrums 542 and 552 is such that travel path 509 is substantially perpendicular to travel paths 505-508.

Figure 11:
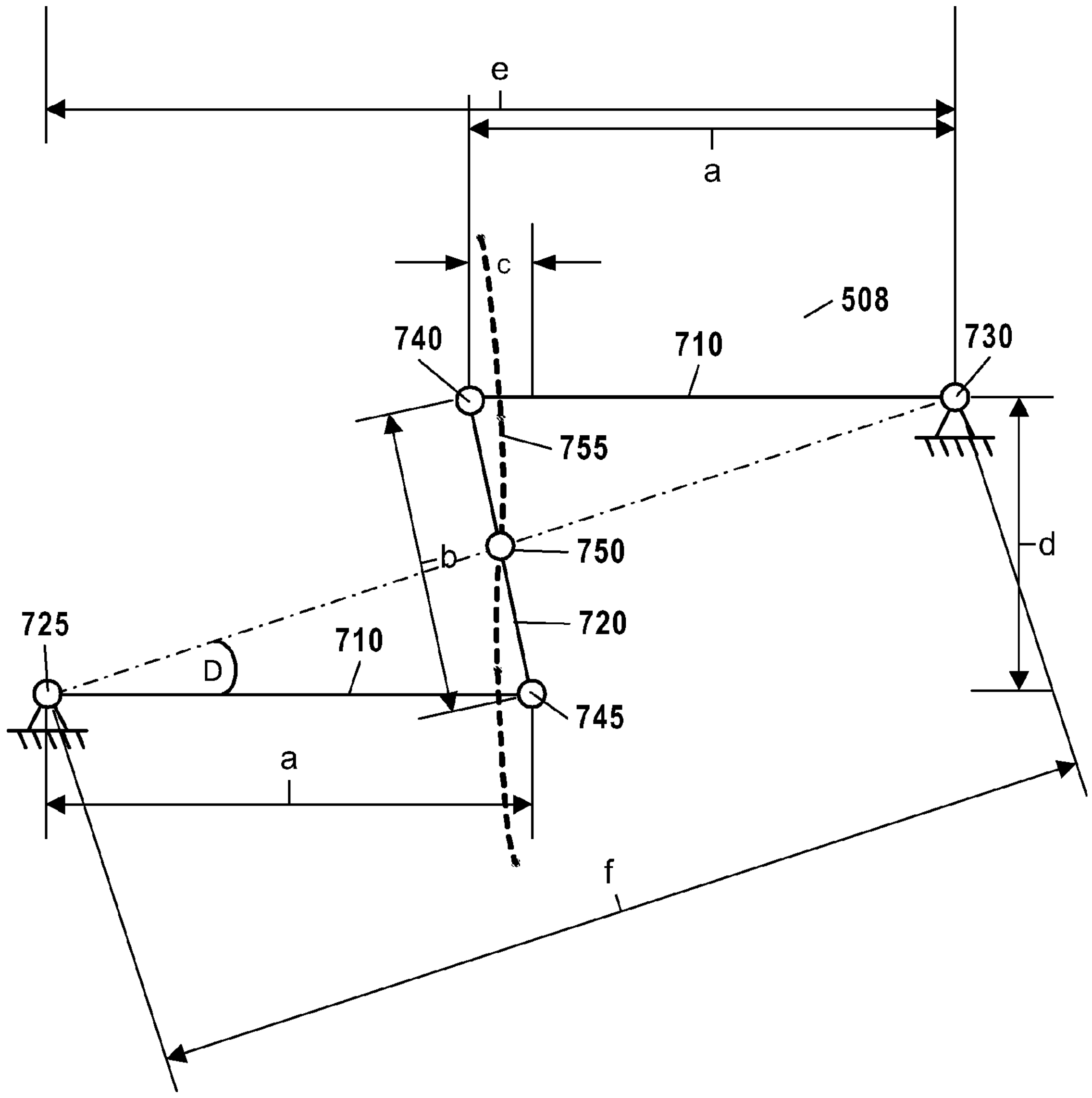
FIG. 11 is a dimensional diagram of a watt linkage mechanism usable in the present invention.

FIG. 11 is a dimensional diagram of a watt linkage mechanism usable in the present invention. A dynamic and static force analysis can be used to predict approximately optimal ratios between the length a of side links 710, length b of the coupler link 720, and the distance f between frame-fixed pivots 725 and 730 for each of the 4 piston-driven watt linkages—where substantially straight travel of the piston rods is highly beneficial—and for the connecting-rod-driving watt linkage, where producing a substantially straight path is not as important. Presently, these ratios are believed to be approximately as shown in the following table:

TABLE 1

Preferred dimensional ratios between watt linkage members

| Ratio | Piston-driven watt linkages | CR-driving watt linkage |
|---|---|---|
| a/b | 1.6 | 2 |
| a/f | 0.507 | 0.516 |

The absolute values of a, b, and f may vary depending on the size and power of the engine one wishes to make.

Once the values for a, b, and f are determined, it is possible, using basic trigonometry, to determine the angle D between the line intersecting frame-fixed pivots 725 and 730 and the line intersecting fixed pivot 725 and moving pivot 745 when the midpoint 750 (which travels along travel path 755) of coupler link 720 intersects the line connecting frame-fixed pivots 725 and 730. Then, if one treats the frame-fixed pivot as the center of a hypothetical x-y coordinate system, with the x-axis being collinear with the line intersecting frame-fixed pivot 725 and moving pivot 745 when the midpoint 750 intersects the line connecting frame-fixed pivots 725 and 730, then it is also possible to determine the x- and y-axes displacements e and d, respectively, of pivot 730 with respect to pivot 725. These values can then be used to determine the relative spacing and angular orientations of the fixed-frame pivots 542, 552 and 581-584 (FIG. 7) of an engine built to simulate the embodiment depicted in FIG. 7.

Basic trigonometry can also be used to determine the angular travel of each of the pivots 725, 740, 745, and 730 of the watt linkage through the travel path 755 of the piston. The necessary diameters of each of the pivots will be a function of numerous variables, including the strength properties of the materials selected and the moments and forces each pivot needs to be able to withstand in operation.

Based on some preliminary modeling and analysis, I believe that a four-cylinder engine built in accordance with my H-cross configured force-transfer mechanism could deliver power equal to that of a standard in-line four-cylinder engine with as little as 28% of the oil shear area times shear distance that one would find in a comparable in-line four-cylinder engine. The following tables compare the expected shear area times distance traveled between the two engines, using reasonable assumptions for the bearing diameters:

TABLE 2 anticipated bearing dimensions for H-cross four-cylinder engine

| Bearing type | Number of bearings | Degrees of rotation/revolution of crankshaft | bearing diameter (in.) | bearing length (in.) |
|---|---|---|---|---|
| Outermost bearing | 8 | 120 | .5 | .75 |
| Inner bearing of outer link | 8 | 118 | .5 | .75 |
| piston pins | 4 | 60 | .875 | 1 |
| bell crank pins | 12 | 118 | .75 | .75 |
| bell crank mains | 4 | 120 | 1.25 | .75 |
| Connecting rod wrist pin | 1 | 60 | 1 | 1 |
| rod journal bearing | 1 | 360 | 1.875 | 1 |
| Crankshaft main bearing | 2 | 360 | 2 | 1 |

TABLE 3 oil shear-area times shear distance traveled for an H-cross four-cylinder

| Bearing type | oil shear area/bearing (in.^2) | shear area travel distance per revolution of crankshaft (in.) | product of shear area times shear travel times number of bearings (in.^3) |
|---|---|---|---|
| outermost bearing | 2.36 | 0.524 | 4.93 |
| inner bearing of outer link | 2.36 | 0.515 | 4.85 |
| piston pins | 2.75 | 0.458 | 5.04 |
| bell crank pins | 3.53 | 0.772 | 16.4 |
| bell crank mains | 5.89 | 1.31 | 15.4 |
| connecting rod wrist pin | 3.14 | 0.524 | 1.64 |
| rod journal bearing | 5.89 | 5.89 | 34.7 |
| crankshaft main bearing | 6.28 | 6.28 | 79.0 |
| TOTAL | — | — | 162 |

TABLE 4 comparable dimensions for a standard in-line 4 cylinder engine

| Bearing type | Number of bearings | Degrees of rotation/revolution of crankshaft | bearing diameter (in.) | bearing length (in.) |
|---|---|---|---|---|
| rod journal bearing | 4 | 360 | 2 | 1 |
| main bearing | 5 | 360 | 2 | 1 |
| wrist pin | 4 | 60 | 1 | 1 |
| piston skirts | 4 | n/a | n/a | n/a |

TABLE 5 oil shear-area times shear distance traveled for a standard in-line 4 cylinder engine

| Bearing type | oil shear area/bearing (in.^2) | shear area travel distance per revolution of crankshaft (in.) | product of shear area times shear travel times number of bearings (in.^3) |
|---|---|---|---|
| rod journal bearing | 6.28 | 6.28 | 158 |
| main bearing | 6.28 | 6.28 | 197 |
| wrist pin | 3.14 | 3.14 | 39.5 |
| piston skirts | 8 | 6 | 192 |
| TOTAL | — | — | 587 |

The bearing diameter assumptions for the standard in-line 4-cylinder engine are relatively close to the actual diameters seen in modern-day care engines. The bearing diameter assumptions for the inventive embodiment, although somewhat smaller, are reasonable based on the anticipated loading on each of the bearings and because many of the bearings will have a diameter-to-length ratio that is relatively close to one.

The value of reducing the total shear area times distance traveled per crankshaft revolution is confirmed by the fact that the force needed to overcome mechanical friction between the lubricated surfaces of the bearing is not only directly proportional to the surface area of the sliding surfaces, but also directly proportional to the relative velocity of the sliding surfaces. This relationship is expressed by the following formula:

$$F=\mu*V*A/Y$$

where $\mu$ is the coefficient of viscosity, V is the velocity, A is the sliding surface area, and Y is the distance separating the two sliding surfaces. For purposes of the embodiments disclosed herein, the velocity V is directly proportional to the shear distance traveled per crankshaft revolution times the revolutions per minute (RPM) of the crankshaft.

Because the preferred embodiment reduces the total shear area times distance traveled per crankshaft revolution, the preferred embodiment should reduce the frictional losses of the engine. The invention's enablement of reductions in the weight and size of the crankshaft contributes to further efficiency gains. Accordingly, it is believed that the resulting reduction in frictional losses will significantly improve the efficiency of the engine, particularly under part-load conditions.

Figure 12:
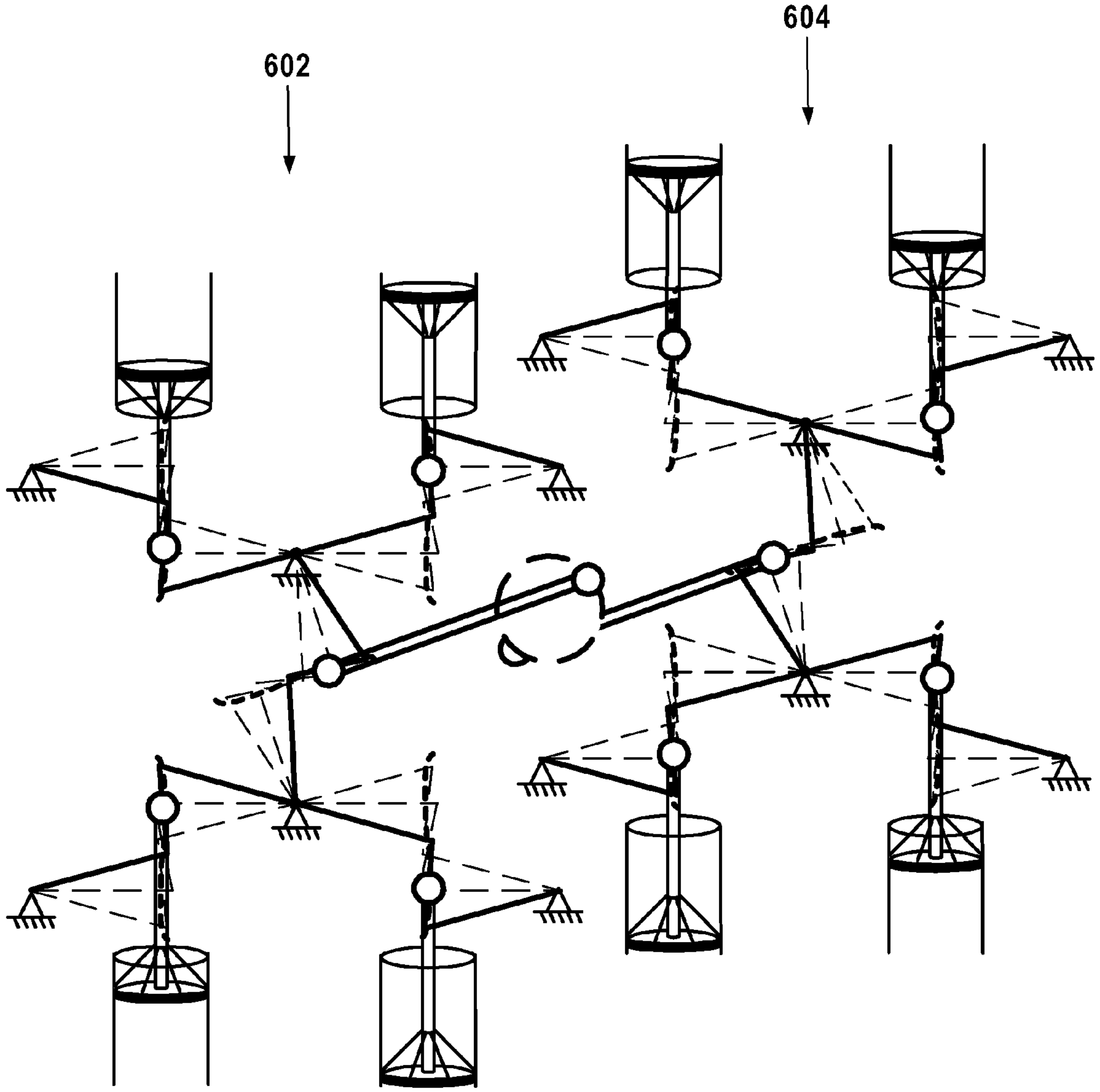
FIG. 12 is one embodiment of an eight cylinder configuration with two force transfer mechanisms disposed on opposite sides of the crank shaft.
Figure 13:
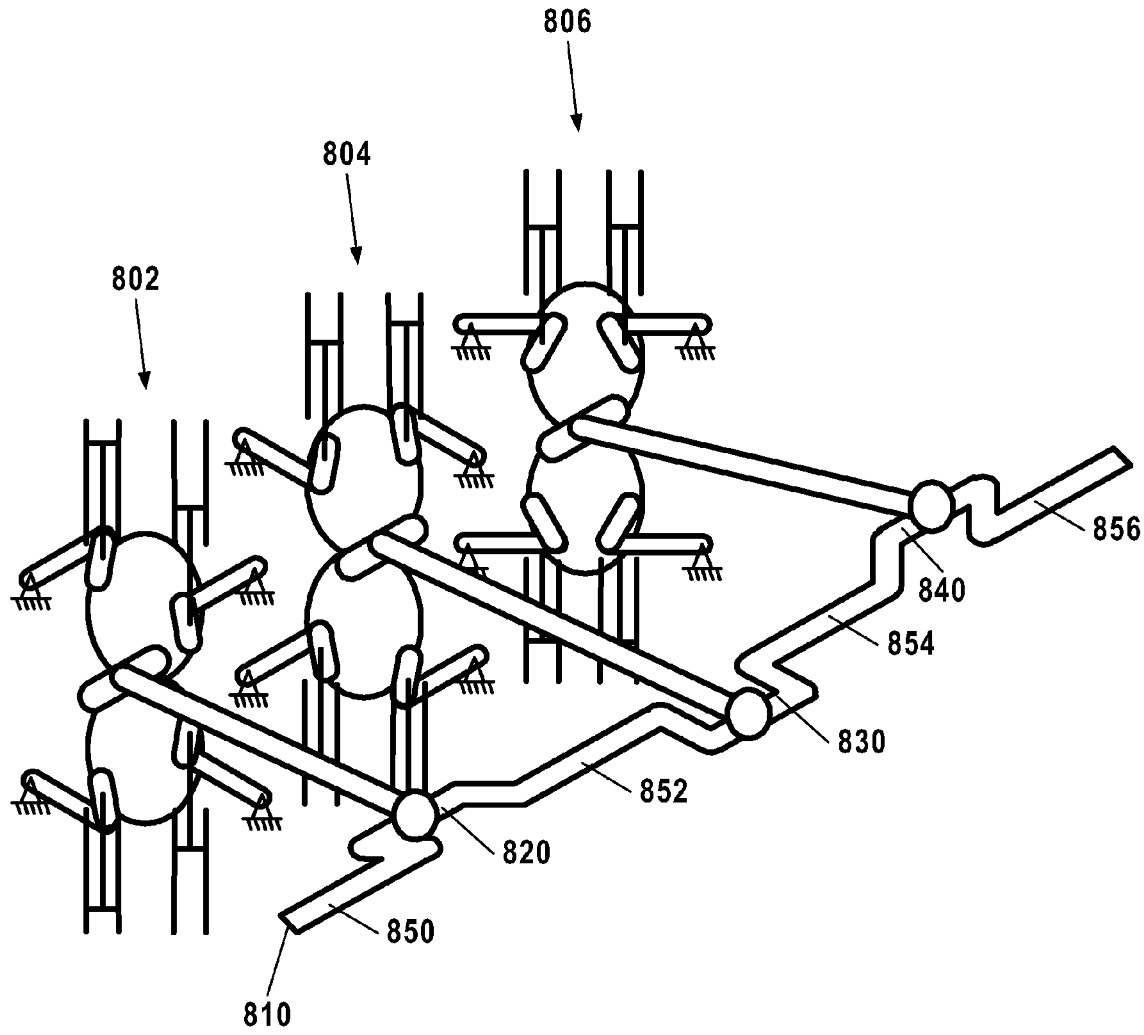
FIG. 13 is one embodiment of a twelve cylinder configuration with three force transfer mechanisms stacked next to each other on the same side of the crank shaft.

It is stressed that the invention is not limited to a 4-cylinder configuration. FIG. 12 illustrates an embodiment of an eight cylinder configuration with 2 force transfer mechanisms 602 and 604 disposed on opposite sides of the crank shaft (not shown). FIG. 13 illustrates an embodiment of a 12-cylinder configuration with 3 force transfer mechanisms 802, 804 and 806 stacked next to each other on the same side of crankshaft 810. In this configuration the crankshaft 810 would have four main journals 850, 852, 854, and 856 and three rod journals 820, 830, and 840 that are offset 120 degrees apart from each other.

Figure 14:
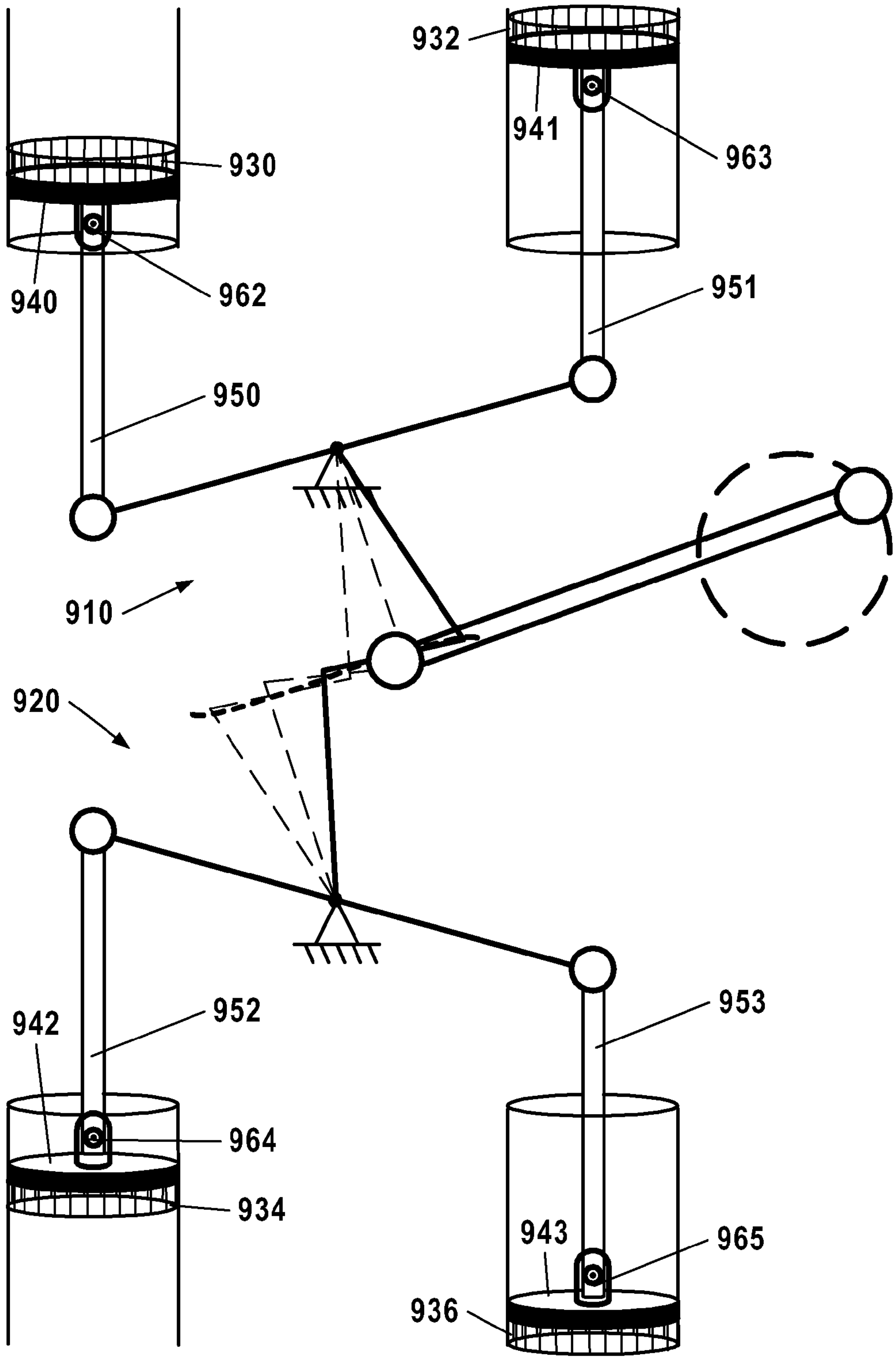
FIG. 14 is an alternative embodiment of a force transfer mechanism according to the present invention which employs a standard crank and slider mechanism to drive the bell cranks.

It is also stressed that the invention, unless so specified in the claims, is not necessarily limited to a multiple watt-linkage mechanism. FIG. 14 is an alternative embodiment of a force transfer mechanism according to the present invention which employs a standard crank and slider mechanism to drive the bell cranks. In this embodiment the force transfer mechanism 900 includes only one watt linkage mechanism driven by bell cranks 910 and 920. Each of the bell cranks 910 and 920 are driven by pistons 940, 941, 942, and 943 that are attached via wrist pins 962, 963, 964, and 965 to piston rods 950, 951, 952, and 953. In this embodiment the piston rods 950-953 do not travel in as straight a line as they would were they driving watt linkage mechanisms. However, their paths are still straighter then what one would find in a standard in-line four-cylinder engine. Accordingly, the lateral loads experienced by each piston 940-943 on its corresponding cylinder are still substantially reduced, which reduces the needed length of the piston skirt 930, 932, 934, or 936.

Figure 15:
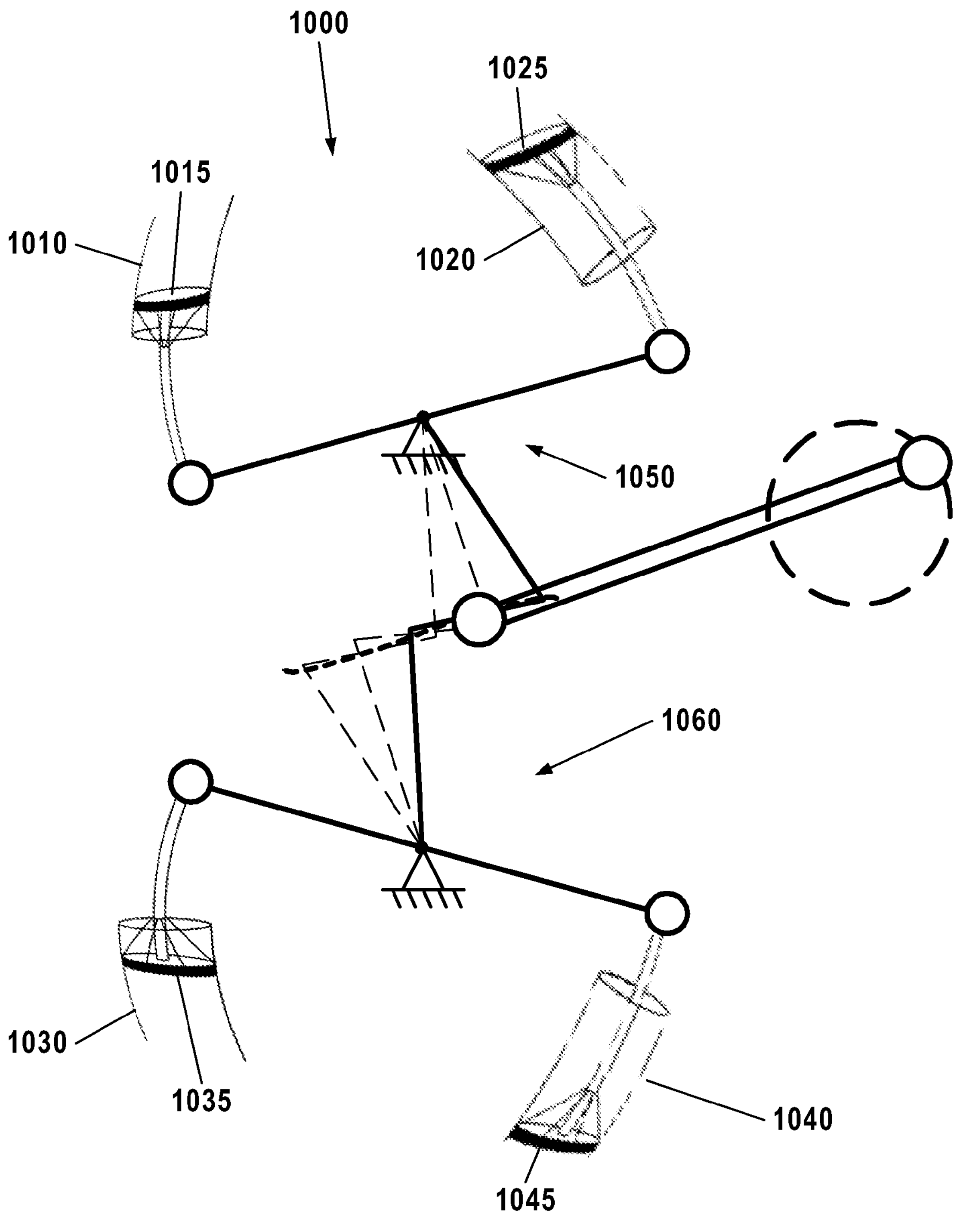
FIG. 15 is another alternative embodiment which employs curved piston cylinders to drive the bell cranks.

FIG. 15 is another alternative embodiment of a force transfer mechanism 1000 that utilizes only a single watt linkage mechanism and uses curved piston cylinders 1010, 1020, 1030, and 1040, to drive the bell cranks 1050 and 1060. The curved construction of the cylinders 1010, 1020, 1030, 1040, allows the corresponding pistons 1015, 1025, 1035, and 1045, to travel along substantially curvilinear paths as they drive the bell cranks 1050 and 1060, thus again eliminating the need for piston skirts.

Figure 16:
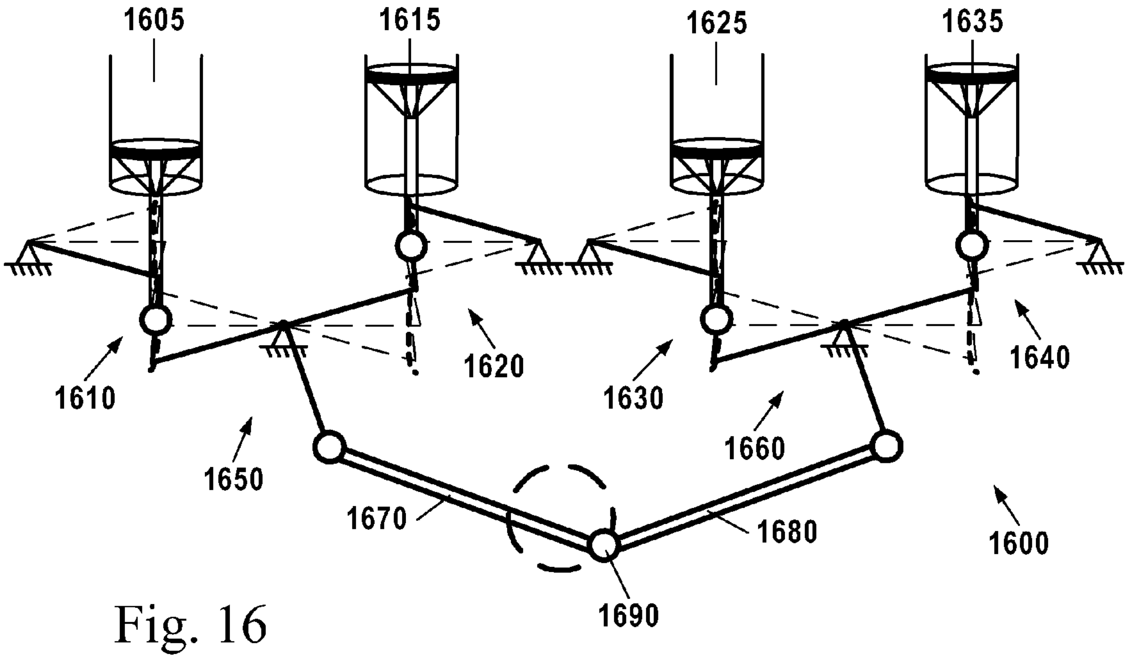
FIG. 16 is an alternative embodiment of a force transfer mechanism that utilizes watt linkage mechanisms to drive the bell cranks, but not to drive the crank shaft.
Figure 17:
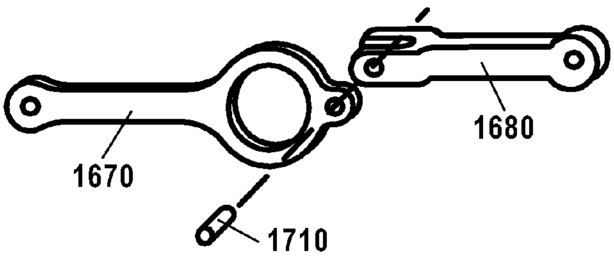
FIG. 17 is an exploded view of one embodiment of a linkage between two connecting rods of FIGS. 16 and 18.

FIG. 16 is an alternative embodiment of a force transfer mechanism 1600 that utilizes four watt linkage mechanisms 1610, 1620, 1630, and 1640 to drive bell cranks 1650 and 1660, which drive two separate two connecting rods 1670 and 1680. In this embodiment, the pistons 1605, 1615, 1625, and 1635 are all be oriented in the same direction, and there is no watt linkage mechanism between the bell cranks 1650 and 1660 and the crankshaft 1690. In one sub-embodiment, the connecting rods 1670 and 1680 drive two separate crank throws (not shown) on the crankshaft 1690. In another sub-embodiment, shown in FIG. 17, the connecting rods 1670 and 1680 are linked together with a pin 1710, so that the between-cylinder forces are transferred from one connecting rod to the other.

Figure 18:
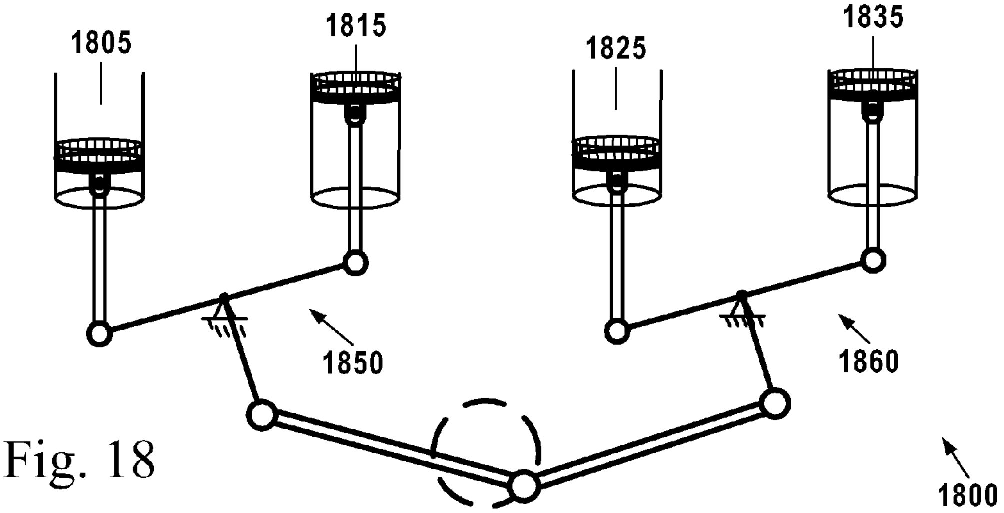
FIG. 18 is an alternative embodiment of a force transfer mechanism that utilizes no watt linkages, but which still achieves some of the advantages of the present invention.

FIG. 18 is yet another alternative embodiment of a force transfer mechanism 1800 that is similar to the force transfer mechanism 1600 of FIG. 16, but which utilizes no watt linkages. In this embodiment, pistons 1805, 1815, 1825, and 1835 drive bell cranks 1850 and 1860 in the same fashion described and depicted with respect to FIG. 14. The force transfer mechanism 1800 still distributes the between-cylinder forces better than the conventional 4-cylinder in-line engine. It also still reduces the necessary length of the piston skirts and the projected shear area times distance traveled per crankshaft revolution.

As used in this specification and claims, the term "bell crank" refers broadly to a first-class lever that rotates about a fulcrum and is used to convert the direction of reciprocating movement. The bell crank may include one or more input force points where force is applied to the bell crank, and one or more output force points where the input force is transferred to one or more other bodies. The same point may serve as either an input force point or an output force point, depending on the particular stroke (intake, compression, power, exhaust) that a given piston is in.

In a bell crank, the imaginary line connecting the fulcrum to the point on the bell crank where an input force is applied is at an angle, other than 0 or 180 degrees, from the imaginary line connecting the fulcrum to at least one other point on the bell crank where force is transferred to another body.

A bell crank, however, may include two or more output force points, one of which is disposed 180 degrees from the input force point, provided that at least one of the other output force points is disposed at some angle other than 0 or 180 degrees from the input force point. For example, FIGS. 1-3 and 7-10 depict bell cranks with three bell crank pins or pivots, the first two of which are disposed approximately 180 degrees (with respect to the frame-fixed fulcrum) from each other, and a third of which is disposed approximately 75 degrees and 115 degrees, respectively, from the first two bell crank pins or pivots.

As used in this specification and claims, a bell crank is not limited to cranks that change motion around a 90 degree angle. Nor is it limited to a two-armed lever that shares a fulcrum at the point where the arms join. As used in this specification, even a wheel—in which a force input point is disposed at an angle, with respect to the fulcrum, from a force output point—could serve as a bell crank. Indeed, given that it is preferable that a bell crank be structurally designed to achieve a high strength-to-weight ratio, an optimal bell crank for use as part of an engine force transfer mechanism will be more structurally complex than a simple two- or three-armed lever.

As used in this specification and claims, a "watt linkage" refers to what mechanical engineers would schematically characterize as a type of a planar "four-bar linkage" comprising four rigid bodies (one of which is the frame), each of which are attached to two of the other bodies by single joints or pivots to form a closed loop. A watt linkage is further characterized as comprising two "side links" of approximately equal and constant functional length hinged via frame-fixed pivots to a frame and a "coupler link" opposite the frame pivotally connected on either end (via pivots that are not fixed with respect to the frame) to the distal ends of the two "side links." (The "functional length" of the side link would be the distance between the frame-fixed pivot and the coupler-link pivot of the side link.) The side links and coupler link can rotate to some extent about their pivots, but they are not free to translate with respect to those pivots. As used in this specification and claims, a "watt linkage" does not suggest that any of its four rigid bodies take the form of rods or bars or linear members.

It should be understood that when the claims recite a "watt linkage" mechanism, that mechanism may include, as one or more of its four rigid bodies, elements that have already been recited in the claim. For example, this patent application's originally-filed claim 1 (which may differ from the issued claim 1 that appears in this patent) recites a "first watt linkage comprising a connecting link pivotally connected on opposite ends to first and second bell cranks, thereby mechanically coupling the first bell crank with the second bell crank." Here, the first and second bell cranks—which have already been recited in the claim—comprise what are, in effect, the "side links" of the "first watt linkage."

As used in the claims, and unless otherwise qualified, the "midpoint of the connecting link"—in the context of a watt linkage mechanism—refers to the functional midpoint of the connecting link, which is the midpoint between the two pivots of the connecting link that join the connecting link with the "side links" of the watt linkage. In theory, the functional midpoint could differ from the actual midpoint if one end of the connecting link extended further beyond its pivot than the connecting link's opposite end extended beyond its opposite pivot. Unless further qualified, the claim language "midpoint of the connecting link" refers to the functional midpoint, not necessarily the actual midpoint, of the connecting link.

As used in this specification and claims, an "H-cross configuration" is a configuration in which 4 piston cylinders are longitudinally oriented in approximately the same plane and in substantially parallel relation to each other, including two opposing pairs of cylinders on opposite sides of a watt-linkage mechanism that transfers the piston forces to a connecting rod. In a "collinear H-cross configuration," each of the cylinders at the top of the "H" are substantially collinear with a corresponding cylinder at the bottom of the "H." Examples of "collinear H-cross configurations" are depicted in FIGS. 1-3 and 7-9. In an "offset H-cross configuration," the cylinders at the top of the "H" are offset from (but still on the same side of the crankshaft as) the cylinders at the bottom of the "H." An example of an "offset H-cross configuration" is shown in FIG. 10. Therefore, it should be understood that the phrase "H-cross configuration," unless otherwise qualified, encompasses both collinear and offset H-cross configurations.

It will be observed that in the drawings accompanying the specification, each force transfer mechanism drives a corresponding connecting rod along a trajectory which—although not entirely linear—is substantially perpendicular to the substantially parallel trajectories of the reciprocating pistons. The substantially parallel trajectories of the reciprocating pistons (more specifically, of the piston pins at the end of the piston rods) are illustrated, for example, in FIGS. 7-10 by reference numbers 505-508. The non-linear trajectory of the connecting rod is illustrated best in FIGS. 1-3 and 14. In all of the illustrated embodiments, the connecting rod is oriented—and its small end travels along a trajectory that is oriented—more perpendicular than parallel to the mostly parallel trajectories of the pistons powering the connecting rod through the force transfer mechanism. Accordingly, to the extent that the claims make reference to a trajectory that is "substantially perpendicular" to a reference trajectory (or trajectories), it is intended that the phrase encompass trajectories that are closer to the perpendicular than to the parallel to the reference trajectory (or trajectories).

Although the foregoing specific details describe various embodiments of the invention, persons reasonably skilled in the art will recognize that various changes may be made in the details of the apparatus of this invention without departing from the spirit and scope of the invention as defined in the appended claims.

The present invention includes several independently meritorious inventive aspects and advantages. Unless compelled by the claim language itself, the claims should not be construed to be limited to structures that incorporate all of the inventive aspects, or enjoy all of the advantages, disclosed herein.

It is well established that the claims of the patent serve an important public notice function to potential competitors—enabling them to not only determine what is covered, but also what is not covered—by the patent. And a number of Federal Circuit decisions have emphasized the importance of discerning the patentee's intent—as expressed in the specification—in construing the claims of the patent.

But defendants in patent infringement suits—while arguing the importance of this public notice function—often seek strained and uncharitable constructions of the claims that would render them either nonsensical, too narrow to have any significant value, or so broad that the claim is anticipated by the prior art. Defendants are apt to mercilessly flog minor grammatical, typographical, or syntactical flaws, if any, in the claims or specification, forgetting that patents are generally written by—and for—engineers and technicians, not by and for grammatical perfectionists and English language PhD's. Furthermore, defendants frequently misconstrue the specification and prosecution history in claim construction briefs and hearings in an effort to get courts to import all kinds of contrived and novel limitations into the construction of the claims. They also frequently strive to—in essence—rewrite the claims so that they do not cover the accused device.

Accordingly, I wish to make my intentions clear—and at the same time put potential competitors on clear public notice. It is my intent that the claims receive a liberal construction and be interpreted to uphold and not destroy the right of the inventor. It is my intent that the claim terms be construed in a charitable and common-sensical manner. It is my intent that the claim terms be construed as broadly as practicable while preserving the validity of the claims. It is my intent that the claim terms be construed in a manner consistent with the context of the overall claim language and the specification, without importing extraneous limitations from the specification or other sources into the claims, and without confining the scope of the claims to the exact representations depicted in the specification or drawings. It is also my intent that not each and every term of the claim be systematically defined and rewritten. Claim terms and phrases should be construed only to the extent that it will provide helpful, clarifying guidance to the jury, or to the extent needed to resolve a legitimate, good faith dispute that is material to the questions of validity or infringement. Otherwise, simple claim terms and phrases should be presented to the jury without any potentially confusing and difficult-to-apply definitional construction.

It is also to be understood that the terminology employed in the Summary of the Invention and Detailed Description sections of this application is for the purpose of describing particular embodiments. Unless the context clearly demonstrates otherwise, is not intended to be limiting. In this specification and the appended claims, the singular forms "a," "tan" and "the" include plural references unless the context clearly dictates otherwise. Conversely, it is contemplated that the claims may be drafted to exclude any optional element or be further limited using exclusive terminology as "solely," "only" and the like in connection with the recitation of claim elements or by use of a "negative" limitation. It is also contemplated that any optional feature of the inventive variations described herein may be set forth and claimed independently, or in combination with any one or more of the features described herein.

The headquarters building of the World Intellectual Property Organization bears the following inscription: "Human genius is the source of all works of art and invention; these works are the guarantee of a life worthy of me; it is the duty of the State to ensure with diligence the protection of the arts and inventions." It is my intent that the claims of this patent be construed—and ultimately enforced, if necessary—in a manner worthy of this mandate.

I claim:

1. An internal combustion engine comprising:

a crankshaft having a main journal and a rod journal;

a force transfer mechanism external to the crankshaft and coupled to the rod journal of the crankshaft by a single connecting rod;

one or more pairs of reciprocating pistons coupled to the force transfer mechanism and traveling along substantially parallel trajectories, wherein each reciprocating piston has one or more powered and non-powered strokes;

wherein each piston performing a powered stroke drives at least one of the other pistons through one or more of its non-powered strokes substantially only through the force transfer mechanism; and wherein the force transfer mechanism drives the single connecting rod along a trajectory that is substantially perpendicular to the substantially parallel trajectories of the reciprocating pistons.

2. The internal combustion engine of claim 1, wherein each piston has forward and return strokes, and the strokes of the two pistons in each pair of reciprocating pistons are synchronized to have forward strokes at the same time and return strokes at the same time.

3. The internal combustion engine of claim 2, wherein the pistons in each pair of reciprocating pistons are collinear with each other.

4. The internal combustion engine of claim 1, wherein the force transfer mechanism comprises a first class lever that rotates about a fulcrum that is fixed with respect to the engine.

5. The internal combustion engine of claim 4, wherein the force transfer mechanism employs one or more bell cranks to convert a reciprocating input movement along a first direction into a reciprocating output movement in a second direction at an angle, other than 0 or 180 degrees, from the first direction.

6. The internal combustion engine of claim 4, wherein the force transfer mechanism comprises another first class lever that rotates about another fulcrum that is fixed with respect to the engine.

7. The internal combustion engine of claim 6, wherein the force transfer mechanism includes a substantially straight-line, four-bar linkage connecting the first class levers to each other and driving the single connecting rod.

8. The internal combustion engine of claim 7, wherein the substantially straight-line, four-bar linkage is a watt linkage.

9. The internal combustion engine of claim 1, wherein each piston is coupled to the force transfer mechanism by a substantially straight-line, four-bar linkage.

10. The internal combustion engine of claim 9, wherein each substantially straight-line, four-bar linkage is a watt linkage.

11. The internal combustion engine of claim 1, wherein the crankshaft has only a single rod journal and only one connecting rod for transferring work from any pistons to the crankshaft.

12. The internal combustion engine of claim 1, further comprising:

a second force transfer mechanism equivalent to the first force transfer mechanism, the second force transfer mechanism also being external to the crankshaft and coupled to the crankshaft by another connecting rod; and another set of reciprocating pistons, equal in number to the number of reciprocating pistons coupled to the first force transfer mechanism, coupled to the second force transfer mechanism.

13. An internal combustion engine comprising:

a crankshaft having a main journal and a rod journal;

a force transfer mechanism external to the crankshaft and coupled to the rod journal of the crankshaft by a single connecting rod;

the force transfer mechanism comprising one or more first class levers, each first class lever pivoting about a fulcrum that is fixed with respect to the engine;

for each first class lever of the force transfer mechanism, a pair of reciprocating pistons coupled to that first class lever;

each reciprocating piston having forward and return strokes; and wherein the strokes of each of the reciprocating pistons are synchronized so that when one of the reciprocating pistons has a forward stroke, the other of the reciprocating pistons has a return stroke.

14. The internal combustion engine of claim 13, wherein the two pistons in each pair of reciprocating pistons are parallel to each other.

15. The internal combustion engine of claim 13, wherein the force transfer mechanism comprises two first class levers that transfer forces from four pistons to the single connecting rod to the crankshaft.

16. The internal combustion engine of claim 15, having at least two pairs of reciprocating pistons coupled to at least two first class levers, wherein one of the pairs of reciprocating pistons is positioned on one side of the force transfer mechanism, and another of the pairs of reciprocating pistons is positioned on an opposite side of the force transfer mechanism.

17. The internal combustion engine of claim 16, wherein each piston in each pair of reciprocating pistons is collinear with a piston in the opposite pair of reciprocating pistons and is synchronized to have a forward stroke at the same time as the opposing, collinear piston has a forward stroke, and to have a return stroke at the same time as the opposing, collinear piston has a return stroke.

18. An internal combustion engine comprising:

a crankshaft having a main journal and a rod journal;

a plurality of pistons having powered and non-powered strokes;

a force transfer mechanism external to the crankshaft and coupled to the rod journal of the crankshaft by a connecting rod;

the force transfer mechanism comprising a plurality of first class levers, each first class lever pivoting about a fulcrum that is fixed with respect to the engine;

wherein each of the plurality of pistons is coupled to the first class levers of the force transfer mechanism; and wherein each of the pistons are driven through their non-powered strokes through action of another one of the pistons in a powered stroke on the first class levers.

19. The internal combustion engine of claim 18, wherein substantially all of the work driving the pistons through their non-powered strokes is delivered through the force transfer mechanism and substantially none of the work driving the pistons through their non-powered strokes is delivered through the crankshaft.

20. The internal combustion engine of claim 18, wherein at least two of the first class levers are coupled to each other by a link that is attached to and drives the connecting rod.

* * * * *